(12) United States Patent
Liu et al.

(10) Patent No.: US 12,312,173 B2
(45) Date of Patent: May 27, 2025

(54) TRANSFER ROBOT, WAREHOUSE LOGISTICS SYSTEM AND ARTICLE TRANSFERRING METHOD

(71) Applicant: BEIJING GEEKPLUS TECHNOLOGY CO. LTD., Beijing (CN)

(72) Inventors: Kai Liu, Beijing (CN); Langlang Sun, Beijing (CN); Yan Tang, Beijing (CN); Kun Wang, Beijing (CN); Yuhui Xiao, Beijing (CN); Xiang Liu, Beijing (CN)

(73) Assignee: BEIJING GEEKPLUS TECHNOLOGY CO. LTD., Beijing (CN)

( * ) Notice: Subject to any disclaimer, the term of this patent is extended or adjusted under 35 U.S.C. 154(b) by 1008 days.

(21) Appl. No.: 17/357,434

(22) Filed: Jun. 24, 2021

(65) Prior Publication Data
US 2021/0323767 A1 Oct. 21, 2021

Related U.S. Application Data

(63) Continuation-in-part of application No. PCT/CN2019/128111, filed on Dec. 25, 2019.

(30) Foreign Application Priority Data

Dec. 25, 2018 (CN) .......................... 201811594425.4
Dec. 27, 2018 (CN) .......................... 201811614557.9
Jan. 29, 2019 (CN) .......................... 201910087638.6

(51) Int. Cl.
B65G 1/137 (2006.01)
B65G 1/04 (2006.01)
(Continued)

(52) U.S. Cl.
CPC ......... *B65G 1/1373* (2013.01); *B65G 1/0421* (2013.01); *B66F 9/063* (2013.01);
(Continued)

(58) Field of Classification Search
CPC ..... B65G 1/1373; B65G 1/0421; B66F 9/063; B66F 9/0755; B66F 9/122; B66F 9/183
See application file for complete search history.

(56) References Cited

U.S. PATENT DOCUMENTS 7,128,521 B2 * 10/2006 Hansl ........................ B66F 9/07
414/807
9,365,347 B2 6/2016 Nakamura
(Continued)

FOREIGN PATENT DOCUMENTS

CA 3049401 A1 8/2018
CN 102658542 A 9/2012
(Continued)

Primary Examiner — Kyle O Logan
(74) Attorney, Agent, or Firm — Hodgson Russ LLP

(57) ABSTRACT

A transferring robot is disclosed in the disclosure. The transferring robot includes a movable chassis configured to move along a path among adjacent warehouse storage containers; a temporary storage shelf provided on the movable chassis, the temporary storage shelf being configured to store a target case; a fetching assembly provided on the movable chassis, the fetching assembly being configured to extend or retract horizontally relative to the movable chassis, so as to realize fetching and placing of the target case between the storage containers and the temporary storage shelf, where a direction along which the fetching assembly extends or retracts horizontally is perpendicular to a moving direction. A warehousing and logistics system includes the foregoing transferring robot. The disclosure further discloses a warehousing system and an item transferring method.

20 Claims, 12 Drawing Sheets

(51) Int. Cl.
  *B66F 9/06* (2006.01)
  *B66F 9/075* (2006.01)
  *B66F 9/12* (2006.01)
  *B66F 9/18* (2006.01)
(52) U.S. Cl.
  CPC ............ *B66F 9/0755* (2013.01); *B66F 9/122*
    (2013.01); *B66F 9/183* (2013.01)

(56) References Cited

U.S. PATENT DOCUMENTS

| | | | |
|---|---|---|---|
| 9,365,348 B1* | 6/2016 | Agarwal | G06Q 10/087 |
| 10,137,566 B2 | 11/2018 | Bastian, II et al. | |
| 10,173,838 B2 | 1/2019 | Aschauer | |
| 10,683,171 B2* | 6/2020 | Jarvis | G05D 1/661 |
| 2006/0245862 A1* | 11/2006 | Hansl | B65G 1/0435 |
| | | | 414/281 |
| 2015/0210472 A1* | 7/2015 | Nakamura | B65G 1/0435 |
| | | | 414/661 |
| 2017/0225891 A1* | 8/2017 | Elazary | G05D 1/0234 |
| 2018/0057283 A1 | 3/2018 | Peters et al. | |
| 2018/0127211 A1* | 5/2018 | Jarvis | G05D 1/0285 |
| 2018/0127212 A1* | 5/2018 | Jarvis | B60P 1/02 |
| 2018/0265297 A1 | 9/2018 | Nakano et al. | |
| 2021/0323767 A1 | 10/2021 | Liu et al. | |

FOREIGN PATENT DOCUMENTS

| | | |
|---|---|---|
| CN | 104619613 A | 5/2015 |
| CN | 106927179 A | 7/2017 |
| CN | 206569571 U | 10/2017 |
| CN | 107428463 A | 12/2017 |
| CN | 206857488 U | 1/2018 |
| CN | 107878989 A | 4/2018 |
| CN | 108180341 A | 6/2018 |
| CN | 108217038 A | 6/2018 |
| CN | 108328191 A | 7/2018 |
| CN | 108408315 A | 8/2018 |
| CN | 108408316 A | 8/2018 |
| CN | 108495798 A | 9/2018 |
| CN | 207903268 U | 9/2018 |
| CN | 108638078 A | 10/2018 |
| CN | 108820663 A | 11/2018 |
| CN | 208150248 U | 11/2018 |
| CN | 208217598 U | 12/2018 |
| CN | 109227529 A | 1/2019 |
| CN | 109516227 A | 3/2019 |
| CN | 109573449 A | 4/2019 |
| CN | 109941653 A | 6/2019 |
| CN | 209306574 U | 8/2019 |
| CN | 110194341 A | 9/2019 |
| CN | 209480472 U | 10/2019 |
| CN | 209536103 U | 10/2019 |
| DE | 202008015496 U1 | 2/2009 |
| EP | 0169156 B1 | 8/1989 |
| EP | 3904238 A1 | 11/2021 |
| EP | 3647231 B1 | 7/2022 |
| JP | 2003206004 A | 7/2003 |
| JP | 2005089059 A | 4/2005 |
| JP | 2008089059 A | 4/2005 |
| JP | 2012236683 A | 12/2012 |
| JP | 2013047150 A | 3/2013 |
| JP | 2014047042 A | 3/2014 |
| JP | 2015-171113 A | 9/2015 |
| JP | 2016155651 A | 9/2016 |
| JP | 2017119566 A | 7/2017 |
| JP | 2018154479 A | 10/2018 |
| JP | 2022514979 A | 2/2022 |
| KR | 101534301 B1 | 7/2015 |
| KR | 10-2021-0107766 | 9/2021 |
| KR | 1020210107766 A | 9/2021 |
| TW | M545771 U | 7/2017 |
| WO | 2016151505 A1 | 9/2016 |
| WO | 2020135460 A1 | 7/2020 |

* cited by examiner

TRANSFER ROBOT, WAREHOUSE LOGISTICS SYSTEM AND ARTICLE TRANSFERRING METHOD

RELATED APPLICATIONS

This application is a continuation-in-part of International Application No. PCT/CN2019/128111, filed Dec. 25, 2019, which claims priority to Chinese Patent Application No. 201910087638.6 filed on Jan. 29, 2019, Chinese Patent Application No. 201811614557.9 filed on Dec. 27, 2018, and Chinese Patent Application No. 201811594425.4 filed on Dec. 25, 2018, all of which are incorporated herein by reference in their entireties.

FIELD OF THE TECHNOLOGY

The present disclosure relates to the technical field of warehousing and logistics, for example, to a transferring robot, a warehousing and logistics system, and an item transferring method.

BACKGROUND OF THE DISCLOSURE

The rapid development of E-commerce has not only brought unprecedented development opportunities to the warehousing and logistics industry, but also posed severe challenges to warehousing and logistics services. How to carry out package picking in an efficient, low-cost, flexible and accurate way has always been a problem faced by the warehousing and logistics industry. With the continuous development of robotics technology, robots are used to transfer target storage containers, in which goods to be picked up are stored, to worker stations, and then at the worker stations the goods are taken out from the storage containers and put into the order boxes. However, the traditional way of "storage container-to-worker" picking-up requires robots to move the entire storage container to the picking area, which increases the load of the robots and causes a huge waste of resources.

SUMMARY

The present application provides a transferring robot which can improve space utilization of the warehouse and efficiency in transferring a target case.

The present application provides a warehousing and logistics system which improves space utilization of the warehouse and logistics efficiency.

The present application provides another transferring robot, which realizes transferring of cases, simplifies complexity of the structure and operation of the transferring robot, and facilitates ordering and adjusting of the cases by the transferring robot.

The present application provides another warehousing system which improves the efficiency of goods issuance for the warehousing system and reduces the energy consumption of the warehousing system.

The present application provides an item transferring method to resolve the problem in the related art that only cases storing a same type of goods can be transferred at a time and the transferring efficiency is low.

The present application provides a transferring robot, the transferring robot including:
 a movable chassis configured to move along a path among adjacent warehouse storage containers;
 a temporary storage shelf provided on the movable chassis, the temporary storage shelf being configured to store a target case; and
 a fetching assembly provided on the movable chassis, the fetching assembly being configured to extend or retract horizontally relative to the movable chassis, so as to realize fetching and placing of the target case between the storage containers and the temporary storage shelf, where a direction along which the fetching assembly extends or retracts horizontally is perpendicular to a direction along which the movable chassis moves.

The present application provides another transferring robot, the transferring robot including:
 a movable chassis;
 a temporary storage shelf vertically provided on the movable chassis, where the temporary storage shelf are provided with a plurality of case storage areas along a vertical direction, and a connecting portion for connecting a target case is provided within each case storage area; and
 a fetching assembly configured to grip the target case, where the fetching assembly includes two extending arms, the two extending arms are arranged on two sides of the temporary storage shelf along a width direction of the temporary storage shelf, and the fetching assembly can move up and down vertically relative to the temporary storage shelf and extend and retract horizontally relative to the temporary storage shelf so as to separate the target case from the case storage area or place the target case to the case storage area.

The present application provides another transferring robot, the transferring robot including: a movable chassis provided with a robot controller, and a stacking mechanism provided on the movable chassis, where
 the stacking mechanism includes a temporary storage shelf and a transmission component, the transmission component is provided on the temporary storage shelf and moves along a vertical direction of the temporary storage shelf under control of the robot controller;
 the movable chassis provided with a robot controller is configured to move to a transferring position of at least one target case according to a received item transferring instruction; and
 the robot controller is configured to control the transmission component to move up and down along the vertical direction of the temporary storage shelf, fetch the at least one target case, and place the fetched target case onto the temporary storage shelf.

The present application provides a warehousing system including the transferring robot according to any one of foregoing embodiments, and a warehouse storage container for storing the target case.

The present application provides an item transferring method executed by a transferring robot, where the transferring robot includes a movable chassis provided with a robot controller, and a stacking mechanism provided on the movable chassis, the stacking mechanism includes a temporary storage shelf and a transmission component, the transmission component is provided on the temporary storage shelf;
 the method includes:
 receiving an item transferring instruction, wherein the item transferring instruction includes information about a transferring position and a height of at least one target item; and
 moving toward the transferring position of the at least one target item, controlling the transmission component to move up and down along a vertical direction of the temporary storage shelf according to the height of the at least one target item, and fetching and placing the at least one target item onto the temporary storage shelf.

The present application provides an item transferring method including transferring the target case by using the transferring robot according to any one of foregoing embodiments.

REFERENCE NUMBERS IN THE DRAWINGS

Figure 1:
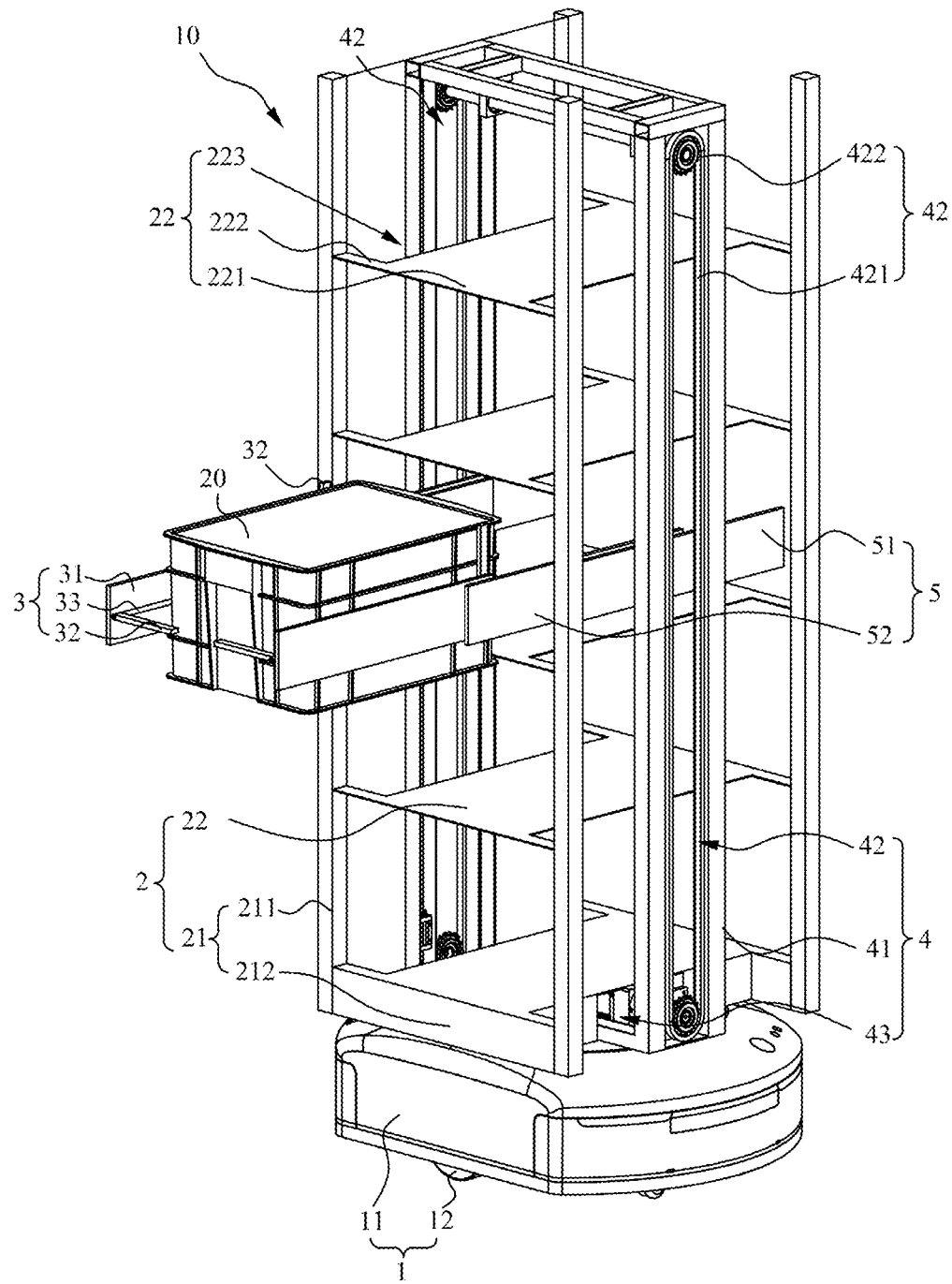
FIG. 1 is a schematic structural diagram of a transferring robot provided in Embodiment 1 of the present disclosure.

10—transferring robot; 20—target case;
1—movable chassis; 11—chassis body; 12—drive wheel;
2—temporary storage shelf; 21—shelf body; 211—support rod; 212—support block; 22—temporary storage plate; 221—main body; 222—connecting portion; 223—opening;
3—fetching assembly; 30—warehouse storage container; 31—extending arm; 32—lever; 33—lever transmission shaft; 34—lever driving assembly;
4—lifting adjustment assembly; 41—lifting bracket; 42—lifting transmission assembly; 421—lifting chain; 422—lifting sprocket; 43—lifting driving assembly;
5—telescoping adjustment assembly; 51—connecting plate; 52—telescoping plate; 53—first telescoping transmission assembly; 531—telescoping sprocket; 532—first telescoping chain; 533—second telescoping chain; 534—first transmission belt; 535—first transmission wheel; 54—second telescoping transmission assembly; 541—second transmission belt; 542—second transmission wheel;
55—telescoping driving assembly; 56—telescoping guiding assembly; 561—first guide groove; 562—second guide grooves; 563—first guide rail; 564—second guide rail; 57—limit detection switch;
6—clamping assembly; 61—first left sensor; 62—first right sensor; 63—second left sensor; 64—second right sensor;
8—connecting portion; 80—case storage area; 81—supporting portion; 82—case portion; 83—extending portion;
100—driving unit; 110—driving mechanism; 200—case storage unit; 220—pallet; 300—case transport unit; 301—flange; 302—supporting member; 303—item; 304—identification code; 310—frame; 320—lifting device; 330—telescoping fork; 340—rotating device; 400—case; 410—first adjustment portion; 420—second adjustment portion;
2100—stacking mechanism; 2200—transmission assembly.

DESCRIPTION OF EMBODIMENTS

The present application will be described below with reference to the drawings and embodiments. It can be understood that the specific embodiments described here are only used to explain the application, but not to limit the application. For description, the drawings only show parts of the structure related to the present disclosure, but not all of the structure.

In the description of the present application, unless expressly specified and defined, the terms "connected", "connecting", and "fixed" shall be understood in a broad sense, for example, there can be a fixed connection, a detachable connection, or an integration; there can be a mechanical connection or an electrical connection; there can be a direct connection or an indirect connection through an intermediate medium; and it can be the internal communication between two elements or the interaction between two elements. For those of ordinary skill in the art, the specific meaning of the above-mentioned terms in the present disclosure can be understood under specific circumstances.

In the present disclosure, unless expressly specified and defined, a first feature being "on" or "under" a second feature may include direct contact between the first feature and the second feature, or include the first feature and the second feature being not in direct contact but through another feature between them. Moreover, the first feature being "above", "over" and "on top of" the second feature may include the case that the first feature being right above and obliquely above the second feature, or simply means that the level of the first feature is higher than that of the second feature. The first feature being "below", "under" and "on bottom of" the second feature includes the case that the first feature being directly below and obliquely below the second feature, or simply means that the level of the first feature is lower than that of the second feature.

In the description of this embodiment, the terms "upper", "lower", "left", "right" and other orientations or positional relationships are based on the orientations or positional relationships shown in the drawings, and are only for convenience of description and for simplification of operations. It does not indicate or imply that the referenced device or element must have a specific orientation, be constructed and operated in a specific orientation, and therefore cannot be understood as a limitation to the present disclosure. In addition, the terms "first" and "second" are used to distinguish in description.

Related technologies propose a picking method of "target case-to-person" to solve the waste of resources and energy consumption caused by the traditional picking method of "storage container-to-person". The picking method of "target case-to-person" is to use a transferring robot to move the target case instead of the storage container to the picking area: after receiving an order instruction, the robot moves to a warehouse path in front of the target case; the robot turns around to face the target case directly, and the telescoping mechanism on the robot extends to take the target case out of the warehouse container and place the case onto a case storage shelf provided on the robot; after completing the gripping of the target case, the robot will turn around again to face the warehouse path directly, so that the robot can move the target case to a designated location along the warehouse path.

For the transferring robot provided by related technologies, the robot needs to turn around in the warehouse path to realize the fetching and placing of the target case or the travelling of the robot in the warehouse container. The motion of turning around requires a wide warehouse path, which is disadvantageous for the space utilization of the warehouse; and each time the robot has to do two turning around to pick up and place one target case, which is disadvantageous for the efficiency of the transferring robot.

Embodiment 1

FIG. 1 is a schematic structural diagram of a transferring robot 10 provided by an embodiment of the application. As shown in FIG. 1, this embodiment provides a transferring robot 10 configured to realize the transferring, fetching and placing of a target case 20. The transferring robot 10 is applicable in warehousing and logistics industry, and performs the fetching, placing and transporting of the target case 20 in which ordered goods or express parcels are stored, so as to realize the order-based pickup or loading operation. The transferring robot can also be applied to other environments where the target case 20 or goods needs to be transferred. The application of the transferring robot 10 in this embodiment is exemplary.

In an embodiment, the target case 20 can be replaced with goods or items, which means that the transferring robot 10 performs fetching, placing and transporting of the goods or items. The target case 20 is exemplary.

In this embodiment, in the warehousing and logistics industry, the transferring robot 10 fetches, loads and transfers the target case 20 in the warehouse container based on orders: when an order management center receives an pick-up order, the order management center analyzes the pick-up order to determine location information of the target case 20 corresponding to the required goods in the pick-up order, and sends the location information to the transferring robot 10. After receiving the pickup information and the location information, the transferring robot 10 automatically navigates to the location of the corresponding target case 20 in the warehouse container, fetches and places the target case 20 onto the transferring robot 10, and then the transferring robot 10 transfers the target case 20 to staff processing area for goods picking. When the order management center receives a loading order, the order management center analyzes the loading order and determines location information where the target case 20 corresponding to goods to be loaded according to the loading order should be placed in the warehouse container, and the order management center dispatches the transferring robot 10 to the staff processing area. The staff places the target case 20 to be loaded onto the transferring robot 10, and at the same time the order management center sends the loading information and the location information to the transferring robot 10. The transferring robot 10 automatically navigates to a location of the warehouse container for placing the target case 20 according to the location information, and takes the target case 20 to be loaded from the transferring robot 10 and places the target case 20 at the designated position of the warehouse container.

The transferring robot 10 provided in this embodiment includes: a movable chassis 1, on which is provided a drive wheel mechanism for driving the movable chassis 1 to move, the movable chassis 1 being configured to realize translation movement and turning movement of the transferring robot 10 on ground; a temporary storage shelf 2 provided on the movable chassis 1, configured to store the target case 20; a fetching assembly 3 provided on the movable chassis 1, configured to realize fetching and placing of the target case 20 between a storage container and the temporary storage shelf 2; a lifting adjustment assembly 4 provided on the movable chassis 1, configured to move the fetching assembly 3 vertically so as to realize the fetching and placing of the target case 20 located at different heights of the warehouse container; a telescoping adjustment assembly 5 provided on the lifting adjustment assembly 4 and moving vertically together with the lifting adjustment assembly 4, the telescoping adjustment assembly 5 being connected with the fetching assembly 3, and being configured to move the fetching assembly 3 horizontally so as to realize the fetching and placing of the target case 20 between the warehouse container and the temporary storage shelf 2; a control assembly, configured to control and adjust an operating status of the transferring robot 10; a detection assembly, configured to detect a working status of the transferring robot 10 and an environment status and assist the control assembly to regulate operation of the transferring robot 10.

The movable chassis 1 includes a chassis body 11 and a drive wheel mechanism provided at bottom of the chassis body 11. In the embodiment, the drive wheel mechanism adopts the form of differential driving, and includes a drive wheel motor, two drive wheels 12 provided at the bottom of the chassis body 11, and a connecting assembly connecting the drive motor and the two drive wheels 12, etc. Two drive wheels 12 are respectively provided on two sides of the chassis body 11 along a direction perpendicular to a horizontal retracting direction of the telescoping adjustment assembly 5, that is, a line connecting centers of the two drive wheels 12 is parallel to the retracting direction of the telescoping adjustment assembly 5, so that a direction of the translation motion of the transferring robot 10 is perpendicular to the horizontal retracting direction of the fetching assembly 3.

In this configuration, after the transferring robot 10 travels in the warehouse path to the front of the target case 20, the fetching assembly 3 may extend and retract toward the target case 20 to realize the fetching and placing of the target case 20 between the warehouse container and the temporary storage shelf 2 without the turning-around movement of the transferring robot 10, thereby reducing the movement space required by the transferring robot 10 in the warehouse path, so that the transferring robot 10 is applicable for transferring target case 20 in a narrow warehouse path, the layout of the warehouse containers in the warehouse is optimized, and the utilization rate of the warehouse is improved; and the transferring robot 10 can move out of the warehouse path by a straight line movement after completing the transfer of the target case 20 between the warehouse container and the temporary storage shelf 2, and transfer the target case 20 to a designated location, simplifying the operation of the transferring robot 10, saving the transportation time of the target case 20, improving the efficiency of the transferring robot 10 to transfer the target case 20, and improving the efficiency of warehousing logistics.

In this embodiment, the drive wheel mechanism is provided on two sides of the middle of the chassis body 11 and is provided symmetrically with respect to the axis of the chassis body 11, which is beneficial to the movement stability of the movable chassis 1. Each of the two ends of the chassis body 11 along the translational movement is provided with a pair of universal driven wheels, and the two pairs of universal driven wheels are provided symmetrically with respect to the pair of drive wheels 12, which further improves the stable movement of the movable chassis 1, especially the stability in turning movement of the movable chassis 1, and prevents the movable chassis 1 from toppling during the movement.

In this embodiment, the drive wheel mechanism using differential drive is commonly used in the art and details are not described in this embodiment. In other embodiments, the drive wheel mechanism may also be other mechanisms that can drive the chassis body 11 to move, such as a single drive mechanism, a dual drive mechanism, or a multi-wheel drive mechanism. This embodiment does not limit the specific structure of the drive wheel mechanism. Any drive wheel mechanism, that can drive the movable chassis 1 to move forward, backward, turn, and rotate in place, with the translational movement direction of the movable chassis 1 being perpendicular to the retracting direction of the fetching assembly 3, is applicable.

In this embodiment, the two sides of the chassis body 11 perpendicular to the horizontal retracting direction of the fetching assembly 3 are flat, which is beneficial to reduce the width of the chassis body 11, thereby reducing the width of the warehouse path required for the travelling of the transferring robot 10 in the warehouse path. The two ends of the chassis body 11 along the direction of movement are in convex arc structures, each of which connects two side planes, which are beneficial to improve the aesthetics of the chassis body 11 and increase the area on the top of the movable chassis 1, and is convenient for the arrangement of the lifting adjustment assembly 4, the temporary storage shelf 2 and the like on the top of the movable chassis 1.

The lifting adjustment assembly 4 includes a lifting bracket 41, a lifting transmission assembly 42 and a lifting driving assembly 43. The lifting bracket 41 is vertically provided on the top of the chassis body 11, and is connected to the chassis body 11 by welding or detachable connection. The detachable connection is threaded connection or the like, which is beneficial to improve the stability and convenience of the connection. The lifting bracket 41 is a frame structure, and the lifting bracket 41 is provided with lifting transmission assemblies 42 and sliding rails on two sides perpendicular to the horizontal retracting direction of the fetching assembly 3, and on each side there are two sliding rails provided in parallel and spaced from each other. It is beneficial to improve the steadiness of the lifting of the telescoping adjustment assembly 5.

The lifting driving assembly 43 is provided at the bottom of the lifting bracket 41, and the lifting driving assembly 43 can be connected to the lifting bracket 41 or can be connected to the chassis body 11. In this embodiment, the lifting driving assembly 43 is a motor, and the lifting transmission assembly 42 is a sprocket-chain transmission assembly. The sprocket-chain transmission assembly includes two lifting sprockets 422 provided at the top end of the lifting bracket 41 and two lifting chains 421 sleeve the two lifting sprockets 422. The telescoping adjustment assembly 5 is connected to part of the lifting chains 421, and the telescoping adjustment assembly 5 is provided with sliding blocks cooperating with the two sliding rails. The vertical lifting of the telescoping adjustment assembly 5 is realized through the coordinated transmission of the lifting sprockets 422 and the lifting chains 421 together with the guidance of the sliding rails and sliding blocks.

In this embodiment, the two lifting transmission assemblies 42 are driven by a same lifting driving assembly 43, and the two lifting transmission assemblies 42 are connected by a lifting transmission shaft between the two lifting sprockets 422 provided at the top end of the lifting bracket 41, the synchronous movement of the two lifting transmission assemblies 42 is realized. In other embodiments, the two lifting transmission assemblies 42 can be driven by two lifting driving assemblies 43 respectively; or the arrangement of the sprocket-chain transmission assemblies can be in other forms, for example, only the lifting sprocket 422 is provided at the top end of the lifting bracket 41, the lifting chain 421 sleeves on the lifting sprocket 422, one end of the lifting chain 421 is connected to the telescoping adjustment assembly 5, and the other end of the lifting chain 421 is connected to a counterweight element, to realize the lifting of the telescoping adjustment assembly 5 through the transmission of the lifting chain 421; or the lifting transmission assembly 42 can also be of a gear-rack type, a pulley drive type, a screw-nut type and other transmission modes. This embodiment does not limit the specific structure and form of the lifting transmission assembly 42, and all the lifting transmission methods capable of realizing lifting movement in the related art can be applied to the lifting transmission assembly 42 in the present disclosure. Since the lifting driving is conventional in the mechanical field, details are not discussed herein.

The temporary storage shelf 2 includes a shelf body 21 and temporary storage plates 22. The shelf body 21 is vertically provided on the top of the movable chassis 1 and configured to support and connect the temporary storage plates 22. A plurality of temporary storage plates 22 are arranged in parallel at intervals along the height direction of the shelf body 21, and each temporary storage plate 22 can be configured to store the target case 20.

In this embodiment, the shelf body 21 includes four vertical support rods 211. The four support rods 211 are provided in a rectangular distribution, and the four support rods 211 are connected at the bottom by a support block 212. The support block 212 and the movable chassis 1 are connected by detachable connection such as threaded connection or by integrated connection such as welding. By providing the support block 212, it is beneficial to improve the stability and reliability of the connection between the shelf body 21 and the movable chassis 1. In addition, the size of the movable chassis 1 can be reduced while ensuring that the dimension of the shelf body 21 meets the requirement for storing the target case 20, thereby further reducing the width of the warehouse path required for the transferring robot 10, and further improving the utilization rate of the warehouse.

The temporary storage plate 22 is horizontally provided between the four support rods 211, and four corners of the temporary storage plate 22 are respectively connected with the four support rods 211. The connection can be welding connection, or can be detachable connection such as screw connection, plug connection, clamping connection and the like. In this embodiment, the temporary storage plate 22 includes a rectangular main body 221, which is located on an inner side of the lifting bracket 41 in the horizontal retracting direction perpendicular to the fetching assembly 3, which is beneficial to make the horizontal projection of the temporary storage shelf 2 lie within the projection range of the movable chassis 1 at least in a direction perpendicular to the horizontal retracting direction, so that in the direction perpendicular to the horizontal retracting direction a maximum width of the transferring robot 10 equals to a maximum width of the movable chassis 1, and during the movement of the transferring robot 10 in the warehouse path, the temporary storage shelf 2 will not cause collision or interference to the warehouse containers on the two sides of the warehouse path.

The main body 221 extends outwardly with connecting portions 222 at both ends of the two sides perpendicular to the horizontal retracting direction, and each connecting portion 222 is connected to a corresponding support rod 211, so that the temporary storage plate 22 has an opening 223 for avoiding the telescoping adjustment assembly 5 on each of the two sides perpendicular to the horizontal retracting direction. When the telescoping adjustment assembly 5 is in a fully retracted state, the vertical lifting of the telescoping adjustment assembly 5 on the lifting bracket 41 may be realized through each opening 223.

In this embodiment, five temporary storage plates 22 are provided on the temporary storage shelf 2, therefore the transferring robot can perform simultaneous transfer of five cases. However, in the present disclosure, the number of temporary storage plates 22 on the temporary storage shelf 2 is not limited, and the number of temporary storage plates 22 on the temporary storage shelf can be set according to requirements.

Figure 3:
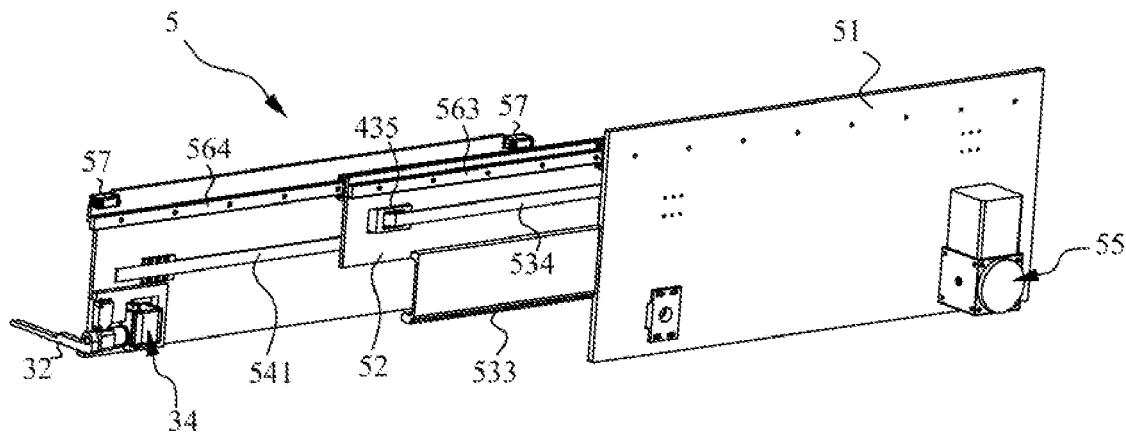
FIG. 3 is a schematic structural diagram of the telescoping adjustment assembly provided in Embodiment 1 of the present disclosure in a second direction.

In this embodiment, the fetching assembly 3 includes extending arms 31, levers 32, and lever driving assemblies 34 (see FIG. 3). Two parallel extending arms 31 are oppositely provided on two sides of the temporary storage shelf 2, and each extending arm 31 is connected with a telescoping adjustment assembly 5. The extension direction of the extending arm 31 is the retracting direction of the telescoping adjustment assembly 5. An inner side of each extending arm 31 is provided with levers 32 and lever driving assemblies 34, and both ends of each extending arm 31 are each provided with one lever 32. The lever driving assemblies 34 are connected to the levers 32 and drive the levers 32 to rotate. The rotation direction of the lever 32 is parallel to the length direction of the extending arm 31.

In this embodiment, the two levers 32 located on the same extending arm 31 may be driven by the same lever driving assembly 34, or alternatively each lever is provided with a corresponding driving assembly 34. The driving assembly 34 is provided on the extending arm 31 and is configured to drive the rotation of the lever 32 connected thereto in a rotatable manner.

The lever driving assembly 34 includes a drive motor and a lever transmission shaft 33. An output shaft of the lever drive motor is connected with the lever transmission shaft 33, both ends of the lever transmission shaft 33 are respectively connected and fixed with the levers 32, and the two levers 32 located at both ends of the same lever transmission shaft 33 are perpendicular to each other.

In another embodiment of the disclosure, for the two levers 32 on the same extending arm 31, the lever 32 connected to an outer side is connected to the extending arm 31 in a rotatable manner, and is driven by the driving assembly 34; and the lever 32 connected to an inner side is fixedly connected with the extending arm 31 and is maintained in a horizontal state.

A rotation axis of the lever 32 connected with the extending arm in a rotatable manner is parallel to the length direction of the extending arm (31). The width of the lever 32 fixedly connected to the extending arm is not limited, and may be a rail or a baffle, which is not limited in this application.

In actual application, the extending arm 31 extends outwardly, the lever 32 at the outer side rotates to a horizontal state, and the case is pulled from a storage rack to the temporary storage shelf of the robot; the fixedly connected lever can push the case on the temporary storage shelf of the robot to the storage rack.

In this embodiment, the drive motor is a steering gear, which can realize precise control of the rotation angle of the lever 32 through the feedback mechanism and angle setting of the steering gear. The steering gear has a small volume, which facilitates the installation and setting of the lever driving assembly 34. In other embodiments, the drive motor can also be a servo motor or in other drive forms capable of controlling the rotation angle.

When the fetching assembly 3 fetches the target case 20 from the warehouse container and places the target case 20 onto the temporary storage plate 22, the telescoping adjustment assembly 5 drives the two extending arms 31 to extend to the two sides of the target case 20 respectively. After the arms 31 are extended by a preset length, the lever driving assembly 34 drives the levers 32 to rotate, so that the lever 32 on a front end of the extending arm 31 is horizontally arranged and is perpendicular to the extending arm 31, and the lever 32 on a rear end of the extending arm 31 is vertically arranged. By controlling the telescoping adjustment assembly 5 to drive the extending arms 31 to retract, the levers 32 at the front end of the two extending arms 31 contact a front end of the target case 20 and take the target case 20 to move toward the temporary storage shelf 2. Since the levers 32 at the rear end of the extending arms 31 are in a vertical state, the passage between the warehouse container and the temporary storage plate 22 is opened, and the target case 20 is place onto the temporary storage shelf 2 under the action of the levers 32. When the fetching assembly 3 takes the target case 20 from the temporary storage plate 22 and places the target case 20 into the warehouse container, the lever driving assembly 34 drives the levers 32 to rotate, so that the lever 32 on the rear end of the extending arm 31 is horizontally arranged and is perpendicular to the extending arm 31, and the lever 32 on the front end of the extending arm 31 is vertically arranged; by controlling the telescoping adjustment assembly 5 to extend, the extending arms 31 are driven to move toward the warehouse container, and the rear ends of the extending arms 31 contact the target case 20 and take the target case 20 to move toward the warehouse container. Since the levers 32 at the front end of the extending arms 31 are in a vertical state, the passage between the temporary storage plate 22 and the warehouse container is opened, and the target case 20 is moved into the warehouse container under the action of the telescoping adjustment assembly 5 and the levers 32.

In this embodiment, the movement of the target case 20 is achieved in the way of moving the target case 20 by the levers 32, which can simplify the structure of the fetching assembly 3, facilitate the operation of the fetching assembly 3, lower the requirement on the fetching assembly 3 for locating the target case 20, and is applicable in fetching and placing target cases 20 of various sizes and shapes. In another embodiment, it is also possible that the fetching assembly 3 only includes extending arms 31, and the target case 20 is gripped and placed by the extending arms 31 clamping the target case 20. In another embodiment, other forms and structures of the fetching assembly 3 can be used to achieve the fetching and placing of the target case 20.

Figure 2:
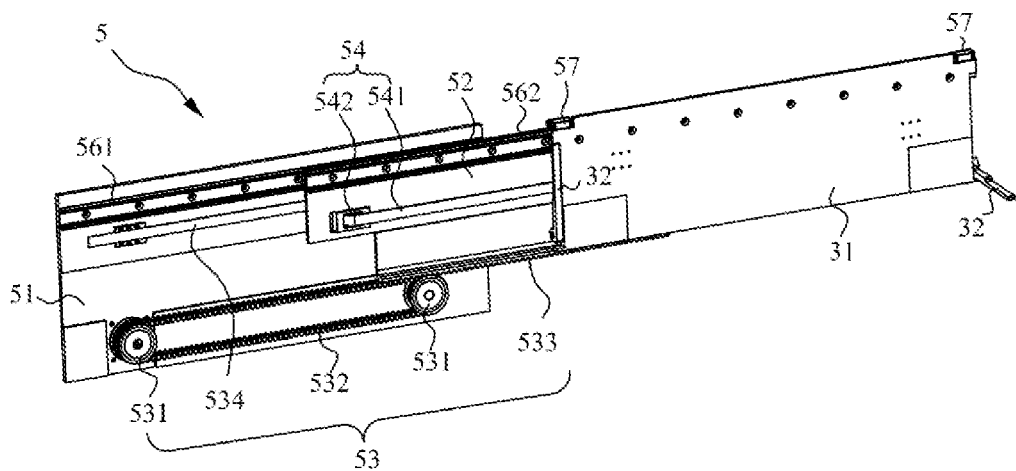
FIG. 2 is a schematic structural diagram of a telescoping adjustment assembly provided in Embodiment 1 of the present disclosure in a first direction.
Figure 4:
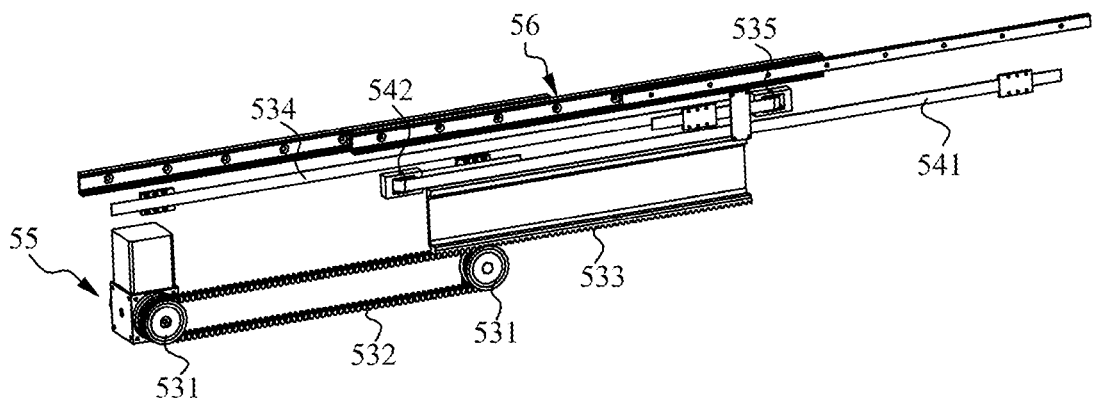
FIG. 4 is a schematic structural diagram of a telescoping transmission assembly provided in Embodiment 1 of the present disclosure.

In this embodiment, the telescoping adjustment assembly 5 is a two-stage telescoping structure, which is beneficial to increase the maximum extending length of the telescoping adjustment assembly 5 while reducing the size of the telescoping adjustment assembly 5 when retracted, thereby reducing the overall size of the transferring robot 10. FIG. 2 is a schematic structural diagram of the telescoping adjustment assembly provided in an embodiment of the application in a first direction, FIG. 3 is a schematic structural diagram of the telescoping adjustment assembly provided in an embodiment of the application in a second direction, and FIG. 4 is a schematic structural diagram of a telescoping transmission assembly provided in an embodiment of the application. As shown in FIGS. 2-4, the telescoping adjustment assembly 5 includes a connecting plate 51, a telescoping plate 52, a telescoping transmission assembly and a telescoping driving assembly 55.

The connecting plate 51, the telescoping plate 52 and the extending arm 31 are parallel to each other. The connecting plate 51 is provided to realize the connection between the first telescoping adjustment assembly 5 and the lifting adjustment assembly 4. An outer side of the connecting plate 51 is provided with a chain connector and two sliding blocks, the chain connector is connected with the lifting chain 421, and the two sliding blocks are in sliding connection with the two sliding rails to realize the steady lifting of the connecting plate 51. The telescoping plate 52 is located on an inner side of the connecting plate 51, and the telescoping plate 52 is located between the connecting plate 51 and the extending arm 31 and is connected to both of the connecting plate 51 and the extending arm 31. The telescoping plate 52 may extend and retract relative to the connecting plate 51, and the extending arm 31 may extend and retract relative to the telescoping plate 52.

In this embodiment, the telescoping transmission assembly adopts two-stage synchronous extension and retraction, that is, when the telescoping plate 52 extends or retracts relative to the connecting plate 51, the extending arm 31 synchronously extends or retracts relative to the telescoping plate 52, so that the efficiency of the telescoping adjustment assembly 5 can be improved and the efficiency of the transferring robot 10 to fetch the cases can be improved.

The telescoping transmission assembly includes a first telescoping transmission assembly 53 provided between the connecting plate 51 and the telescoping plate 52 and a second telescoping transmission assembly 54 provided between the telescoping plate 52 and the extending arm 31.

In this embodiment, the first telescoping transmission assembly 53 includes a primary transmission assembly, where the primary transmission assembly includes two telescoping sprockets 531 provided at both ends of the connecting plate 51, and a first telescoping chain 532 matched with the telescoping sprockets 531 sleeves the two telescoping sprockets 531. One of the telescoping sprockets 531 is connected with the output shaft of the drive motor in the telescoping driving assembly 55, and the output shaft of the drive motor drives the telescoping sprocket 531 to rotate, thereby driving the first telescoping chain 532 to rotate. The telescoping plate 52 is located above the first telescoping chain 532, and the lower lateral side of the telescoping plate 52 is provided with a second telescoping chain 533 that matches with the first telescoping chain 532. The rotation of the second telescoping chain 532 drives the second telescoping c chain 533 to perform translation motion, thereby driving the telescoping plate 52 to extend and retract with respect to the connecting plate 51.

In this embodiment, by adopting a chain-sprocket transmission mode, the extending and retraction of the telescoping plate 52 with respect to the front and rear ends of the connecting plate 51 can be realized on the premise of keeping the position of the first telescoping chain 532 unchanged, so that the telescoping adjustment assembly 5 can drive the extending arm 31 to extend to and retract from either side of the temporary storage shelf 2, and the transferring robot 10 can take the case on either side of the warehouse container without turning and reversing, so as to improve the convenience and flexibility in transferring the target case 20. In other embodiments, other transmission forms, such as screw-nut transmission, a gear-rack transmission and the like, may be used to drive the telescoping plate 52 to extend and retract with respect to the connecting plate 51.

In this embodiment, the first telescoping transmission assembly 53 further includes an auxiliary transmission assembly provided on an upper side of the telescoping adjustment assembly 5, and the auxiliary transmission assembly includes a first transmission belt 534 and a first transmission wheel 535. With reference to the left and right directions of the structure shown in FIG. 4, the auxiliary transmission assembly is described. The left end (right end) of the telescoping plate 52 is provided with a first installation port, and the first installation port travels through two pairs of side surfaces of the telescoping plate 52. The first transmission wheel 535 is installed in the first installation port and can be connected with the telescoping plate 52 in a rotatable manner, and the axis of the first transmission wheel 535 is vertically arranged. One end of the first transmission belt 534 is fixed to a right end (left end) of the connecting plate 51, and the other end of the first transmission belt 534 goes around the first transmission wheel 535 and is fixed on a side of the telescoping plate 52 away from the connecting plate 51. When the movement of the primary transmission assembly drives the telescoping plate 52 to extend and retract relative to the connecting plate 51, the two ends of the first transmission belt 534 approach or move away from each other due to the rotation of the first transmission wheel 535, which helps the telescoping plate 52 to extend or retract relative to the connecting plate 51. By providing the auxiliary transmission assembly, on one hand, the steady extending and retraction of the telescoping plate 52 relative to the connecting plate 51 can be improved, and it is ensured that the telescoping adjustment assembly bears stable force and travels reliably during the extending and retracting movement. On the other hand, since the two ends of the telescoping plate are respectively fixed to the connecting plate 51 and the telescoping plate 52, the maximum extension length of the telescoping plate 52 relative to the connecting plate 51 is limited, playing a role of limiting the extension of the telescoping plate 52.

The second telescoping transmission assembly 54 includes a second transmission belt 541 and a second transmission wheel 542. With reference to the left and right directions of the structure shown in FIG. 4, the second telescoping transmission assembly 54 is described. The right end (left end) of the telescoping plate 52 is provided with a second installation port, and the second installation port travels through two opposite side surfaces of the telescoping plate 52. The second transmission wheel 542 is installed in the second installation port in a rotatable manner, and the axis of the second transmission wheel 542 is vertically arranged. One end of the second transmission belt 541 is fixed to an end of the extending arm 31 away from the connecting plate 51, and the other end of the second transmission belt 541 goes around the second transmission wheel 542 and is fixed to the left end (right end) of the connection plate 51.

When the telescoping plate 52 retracts relative to the connecting plate 51, since the second transmission belt 541 goes around the second transmission wheel 542 provided on the telescoping plate 52 and the length of the second transmission belt 541 is constant, while the second transmission wheel 542 moves in translation with the telescoping plate 52, the second transmission wheel 542 rotates relative to the second transmission belt 541, which makes the length of the second transmission belt 541 on the side of the telescoping plate 52 facing the connecting plate 51 to increase, and the length of the side of the telescoping plate 52 facing the extending arm 31 to decrease, thereby the extending arm 31 is pulled to retract relative to the telescoping plate 52. In the same way, when the telescoping plate 52 extends relative to the connecting plate 51, the second transmission belt 541 and the second transmission wheel 542 drive the extending arm 31 to extend relative to the telescoping plate 52. Thus, when the telescoping driving assembly 55 drives the first telescoping transmission assembly 53 to extend and retract, the extending arm 31 is synchronously driven to extend and retract with respect to the telescoping plate 52, that is, the two-stage synchronous telescoping adjustment of the telescoping adjustment assembly 5 is realized.

In this embodiment, the first transmission belt 534 and the second transmission belt 541 can be belts, synchronous belts, flat belts, or chains. The first transmission wheel 535 and the second transmission wheel 542 are structures that cooperate with the first transmission belt 534 or the second transmission belt 541.

In this embodiment, the lengths of the connecting plate 51, the telescoping plate 52 and the extending arm 31 are basically the same, and the lengths of the first transmission belt 534 and the second transmission belt 541 are basically twice the length of the connecting plate 51, which is beneficial to increase the extension of the extension arm 31 relative to the telescoping plate 52 and the extension of the telescoping plate 52 relative to the connecting plate 51 as much as possible. In other words, the size of the telescoping adjustment assembly 5 in retracted status is reduced, while the maximum extension length of the telescoping adjustment assembly 5 is increased as much as possible, thereby further reducing the overall size of the transferring robot 10.

In this embodiment, in order to improve the steadiness of the extending and retracting movement of the telescoping adjustment assembly 5, the telescoping adjustment assembly 5 further includes a telescoping guiding assembly 56. The telescoping guiding assembly 56 includes a first guide groove 561 and a second guide groove 562 respectively provided on an inner side of the connecting plate 51 and an inner side of the telescoping plate 52, and a first guide rail 563 and a second guide rail 564 respectively provided on an outer side of the telescoping plate 52 and an outer side of the extension arm 31. The first guide rail 563 is in sliding connection with the first guide groove 561, and the second guide rail 564 is in sliding connection with the second guide groove 562.

In this embodiment, the telescoping adjustment assembly further includes limit detection switches 57 provided at both ends of the extending arm 51, which are configured to detect the limit position for the extension or retraction of the extending arm 31, so as to regulate the operation of the telescoping adjustment assembly 5 and ensure the operational reliability of the telescoping adjustment assembly 5.

In an embodiment, the telescoping transmission assembly can also adopt other transmission forms to realize two-stage synchronous extension, such as a gear-rack form. In another embodiment, a telescoping transmission assembly is provided between the telescoping plate 52 and the connecting plate 51 and between the telescoping plate 52 and the extending arm 31 to realize the independent extension and retraction of the telescoping plate 52 and the extending arm 31.

In this embodiment, each telescoping adjustment assembly 5 is provided with a telescoping driving assembly 55, so that the setting of each telescoping driving assembly 55 does not affect the storage of the target case 20 on the temporary storage plate 22. In other embodiments, it is also possible that two telescoping adjustment assemblies 5 share the same telescoping driving assembly 55 to cooperate with the transmission shaft to realize the synchronous movement of the two telescoping transmission assemblies.

In this embodiment, the transferring robot 10 is further provided with a control assembly configured to control the operation of multiple actions of the transferring robot 10. The control assembly includes a controller, an order management module, a navigation module, an information transmission module, an information-processing module, an identification module, a display module, an alarm module, and a power supply module. Each of the drive wheel mechanism, the lifting driving assembly 43, the telescoping driving assembly, the lever driving assembly 34, the detection module and the modules in the control assembly is connected to the controller.

The navigation module is configured to realize the autonomous navigation function of the movable chassis 1 so that the transferring robot 10 can plan the optimal route according to the position of the target case 20 and automatically navigate to the target case 20 according to the planned optimal route. The movable chassis 1 can be navigated in the mode of two-dimensional code, barcode, and radar simultaneous localization and mapping (SLAM) navigation, or it can be guided to the target position by a traditional electric or magnetic guidance.

The information transmission module includes a wireless communication module for realizing the communication between the transferring robot 10 and the outside, and a wired communication module for realizing the internal communication in the transferring robot 10. The wireless communication module is configured to perform wireless communication with the order management center in the warehousing and logistics system to receive order information, so as to realize the scheduling of the transferring robot 10 by the order management center. The wired communication module is configured for the internal communication between the controller and the movable chassis 1, the lifting adjustment assembly 4, the telescoping adjustment assembly 5 and the fetching assembly 3, to control the movement of the movable chassis 1 to a specific position, the raising or lowering of the fetching assembly 3 to a specific position, the extending or retracting of the fetching assembly 3, or a rotation of the lever 32 to a specific angle, so as to achieve the accurate fetching and placement of the target case 20 by the fetching assembly 3.

The order management module is configured to receive information sent by the order processing center to the transferring robot 10, and update completed orders and uncompleted orders in a timely manner according to the transferring actions of the transferring robot 10, so that the system can monitor the status of the orders in real time. The identification module is configured to identify external information and convert the external information into information that can be processed by the controller, such as identifying the barcode information pasted on the bottom surface to realize the path navigation of the movable chassis 1, and identifying the tag code pasted on the target case 20 to obtain information about the goods in the target case 20, where the tag code may be a two-dimensional code, a barcode, or a radio frequency identification (RFID) code, etc. The power supply module is configured to perform power control for the movable chassis 1. The power supply module includes a rechargeable battery, a charging port, and a power on/off circuit provided on the movable chassis 1. The power supply module can be a wired charging module or a wireless charging module. The display module is configured to display an operating status of the transferring robot 10, for example, to display power status of the transferring robot 10 by setting a status indicator and display order processing status by setting a displayer. The alarm module is configured to alarm abnormal operation status of the transferring robot 10, to facilitate the staff to find the fault in time. The alarm module can be one of a buzzer, a voice announcer, a light emitting diode (LED) display, etc., or a combination thereof.

The detection assembly includes an environment monitoring module configured to capture external environment information and an obstacle avoidance sensor configured to detect obstacles. Both the environment monitoring module and obstacle avoidance sensor are connected to the controller and are configured to assist the movable chassis 1 for navigation and obstacle avoidance, so as to achieve the steady traveling of the transferring robot 10.

The detection assembly further includes a detection sensor provided on the transferring robot 10 for locating the position of the target case 20. In this embodiment, the detection sensor is provided on the extending arm 31 of the fetching assembly 3, and both ends of each extending arm 31 are each provided with a detection sensor.

When being used to transfer the target case 20, the transferring robot 10 travels along the warehouse path to the front of the target case 20 according to the order information and the navigation information. However, because of tilted placement of the target case 20 in the warehouse container, the accuracy of the navigation information and the tilt of the warehouse floor, a center of the target case 20 may not be aligned with the center of the fetching assembly 3. If the fetching assembly 3 fetches the case at this time, the extending arms 31 may touch the front surface of the target case 20 instead of extending to the two sides of the target case 20. Therefore, after preliminary positioning by navigation, the detection sensor is used to accurately positioning the fetching assembly 3 relative to the center position of the target case 20.

Figure 5:
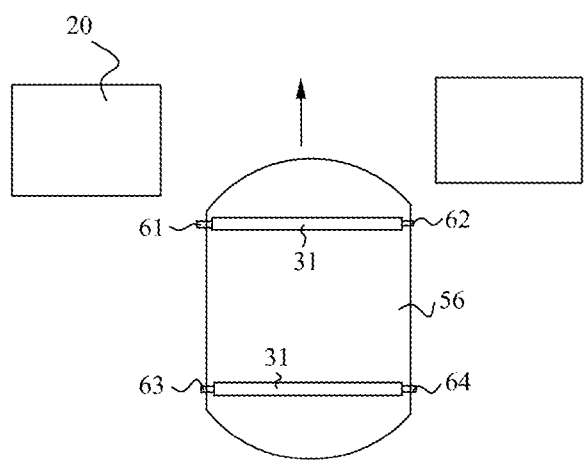
FIG. 5 is a schematic diagram of a method for positioning the center of a target case provided in Embodiment 1 of the present disclosure.

FIG. 5 is a schematic diagram of a method for positioning the center of the target case 20 according to an embodiment of the application. For convenient description of the method for positioning the center of the target case 20, the two detection sensors located on two sides of the front end of the movement direction are respectively named as a first left sensor 61 and a first right sensor 62, and the two sensors located on two sides of the rear end of the movement direction are respectively named as a second left sensor 63 and a second right sensor 64. The first left sensor 61 and the second left sensor 63 are located on a same side of the movable chassis 1, and the first right sensor 62 and the second right sensor 64 are located on a same side of the movable chassis 1.

The method for positioning the center of the target case 20 will be described in the example that the target case 20 is on the left side of the transferring robot 10:

before the transferring robot 10 travels to the front of the target case 20, the fetching assembly 3 rises to a height of the target case 20 according to the position of the target case 20 in the warehouse container;

when the transferring robot 10 travels in the warehouse path into the range where the target case 20 is located, the first left sensor 61 scans a first edge of the target case 20 and a signal from the first left sensor 61 changes from null to non-null, and a coordinate position X1 of the transferring robot 10 at a moment of signal change is recorded;

the transferring robot 10 continues to move forward, the first left sensor 61 scans across a second edge of the target case 20 and the signal of the first left sensor 61 changes from non-null to null, and a coordinate position X2 of the transferring robot 10 at the moment of signal change is recorded;

a coordinate position of the transferring robot 10 corresponding to the center position of the target case 20 is calculated as (X2−X1)/2; and by calculating the coordinate of the transferring robot 10 corresponding to the center position of the target case 20, the transferring robot 10 is moved to the coordinate position (X2−X1)/2, so that the center of the fetching assembly 3 can be aligned with the center of the target case 20. At this time, by extending the extending arms 31, the two extending arms 31 can be respectively located on two sides of the target case 20, avoiding collision or interference between the extending arms 31 and the target case 20, and improving the accuracy of picking up the target case 20 by the fetching assembly 3.

In an embodiment of the disclosure, the transferring robot 10 may include a calculation unit and a control unit; the calculation unit records a position X1 of the transferring robot 10 once the detection sensor scans an edge of the target case (20) for the first time, and records a position X2 of the transferring robot 10 once the detection sensor scans an edge of the target case 20 for the second time; and calculates a center position of the target case (20) as (X2−X1)/2; and the control unit controls the transferring robot 10 to move to the center position (X2−X1)/2.

In this embodiment, the detection sensor is an infrared sensor, and different detection signals are output dependent on whether the light emitted by the target case 20 to the infrared sensor is blocked by the target case 20.

In this embodiment, the center position of the target case 20 may be in front of a navigated position. At this time, the transferring robot 10 is driven to continue to move forward to the center position of the target case 20. The center position of the target case 20 may also be behind the navigated position. At this time, after reaches the navigated position, the transferring robot 10 moves backward to the center position of the target case 20.

When the target case 20 is located on the right side of the transferring robot 10, the method for determining the center of the target case 20 is the same, except for using the first right sensor 62 in detection. When the moving direction of the transferring robot 10 is opposite to the direction shown in the drawing, the second right sensor 64 or the second left sensor 63 is used for position detection. In other words, by providing detection sensors at both ends of each extending arm 31, it is possible to accurately position the target case 20 regardless of different movement directions and on different sides of the transferring robot 10, thereby improving the accuracy of the transferring robot 10 or the fetching and placement of the target case 20.

In this embodiment, the detection assembly may further include a camera module for identifying position tag code. The warehouse container is provided with position tag codes corresponding to center positions of areas for storing the target cases 20, and the position tag codes together with the camera module are used by the transferring robot 10 to obtain position coordinates of the target cases 20 in the accurate loading.

This embodiment further provides a case transferring method used in picking up goods, which includes the following steps:

Step 1: the transferring robot 10 receives order information from an order management center and analyzes location of ordered goods;

Step 2: the transferring robot 10 plans an optimal travel path according to the location of the ordered goods, and automatically navigates along a warehouse path;

Step 3: during the automatic navigation of the transferring robot 10, a center of a target case 20 is located by using the above-mentioned method for locating the center of the target case 20;

Step 4: the transferring robot 10 moves to a position (X2−X1)/2 corresponding to the center of the target case 20;

Step 5: the telescoping adjustment assembly 5 controls the extending arms 31 to extend by a preset length;

Step 6: the lever driving assembly 34 drives the lever 32 facing the target case 20 to be placed horizontally;

Step 7: the telescoping adjustment assembly 5 controls the extending arms 31 to retract to an initial state; and Step 8: the transferring robot 10 moves out of the warehouse path in translation and moves to a target picking position.

This embodiment further provides a case transferring method used in loading goods, which includes the following steps:

Step 1: after receiving loading instruction, the transferring robot 10 moves to a loading area, and the target case 20 is placed on the temporary storage shelf 2 of the transferring robot 10 by labors or by mechanical arms;

Step 2: the transferring robot 10 plans an optimal travel path according to a position of the target case 20 in the warehouse container, and automatically navigates along a warehouse path;

Step 3: during the automatic navigation of the transferring robot 10, a center position of an area for storing the target case 20 in the warehouse container is determined by the camera module and the position tag code on the warehouse container;

Step 4: the transferring robot 10 moves to a position corresponding to the center position of the area for storing the target case 20;

Step 5: the lever driving assembly 34 drives the lever 32 at an end farther from the warehouse container to be placed horizontally;

Step 6: the telescoping adjustment assembly 5 controls the extending arms 31 to extend by a preset length; and Step 7: the telescoping adjustment assembly 5 controls the extending arms 31 to retract to an initial state.

Figure 14:
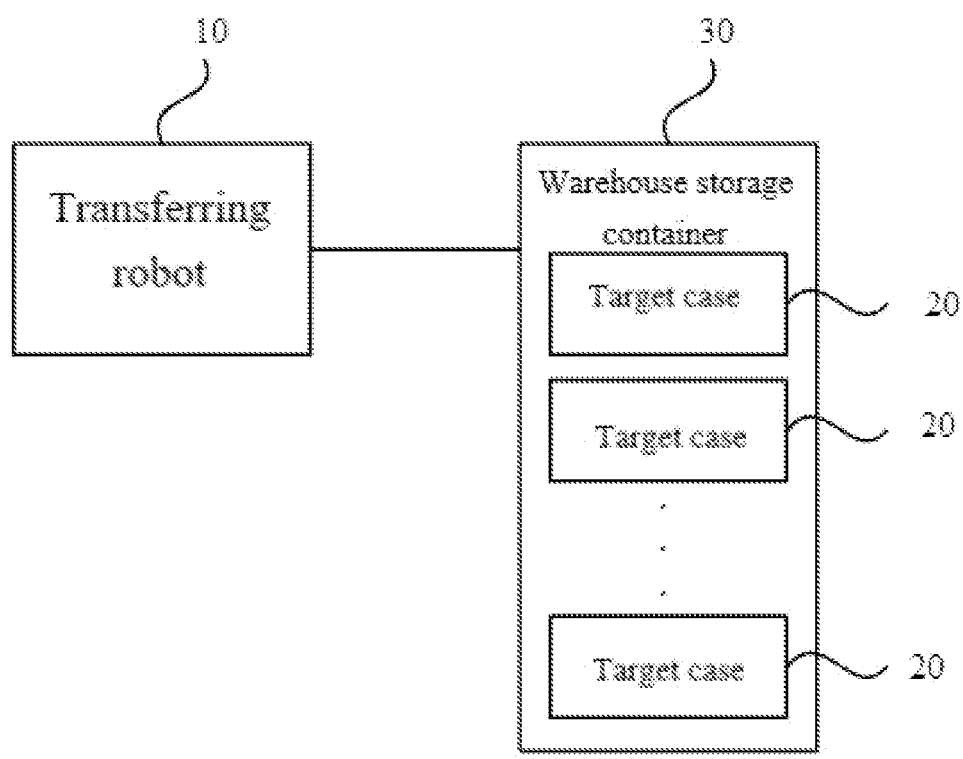
FIG. 14 is a schematic structural diagram of a warehousing system provided in an embodiment of the present disclosure.

As shown in FIG. 14, this embodiment further provides a warehousing logistics system, which includes the aforementioned transferring robot 10 and further includes a warehouse storage container for storing the target case 20.

In the warehousing system provided according to the present disclosure, by using the above-mentioned transferring robot, the width of the warehouse path required by the transferring robot is reduced, the warehouse layout is optimized, the utilization rate of the warehouse space is improved, and logistics efficiency is enhanced.

Embodiment 2

Figure 6:
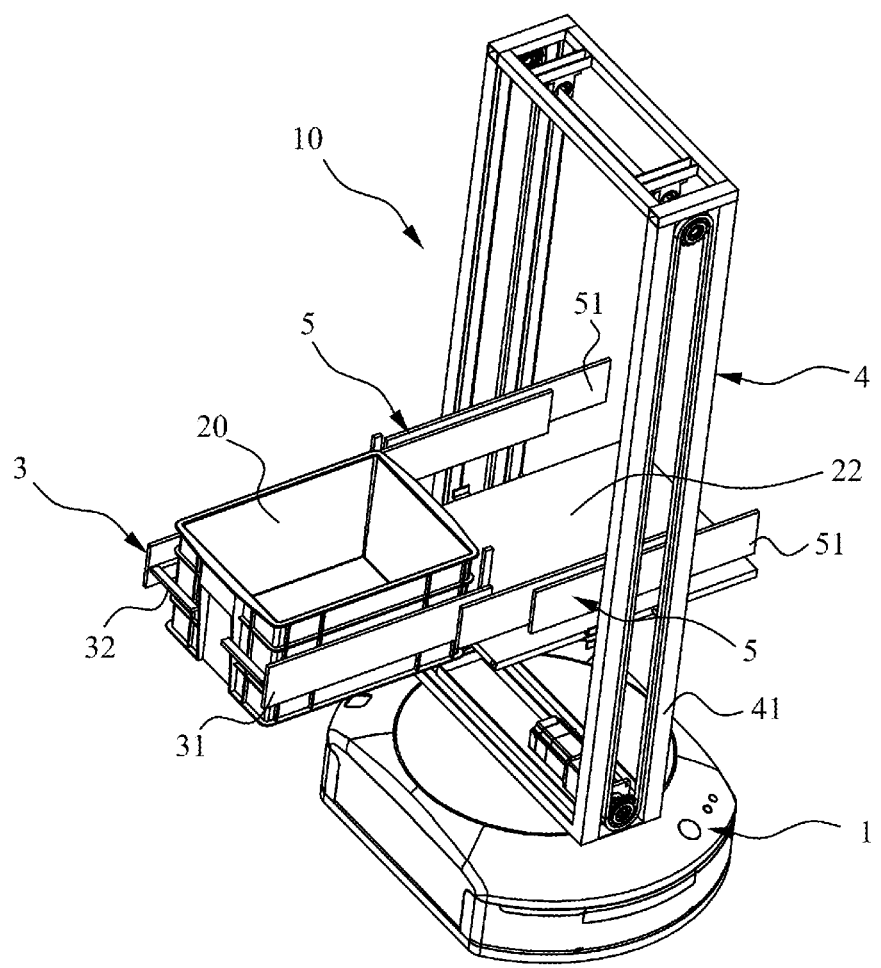
FIG. 6 is a schematic structural diagram of a transferring robot provided in Embodiment 2 of the present disclosure.

FIG. 6 is a schematic structural diagram of a transferring robot 10 provided by an embodiment of this application. As shown in FIG. 6, this embodiment provides a transferring robot 10 configured to transfer a target case 20. Compared with the embodiment 1, the transferring robot 10 provided in this embodiment, having the same basic structure as the transferring robot 10 provided in the embodiment 1, includes a movable chassis 1, a lifting adjustment assembly 4, a temporary storage shelf 2, a telescoping adjustment assembly 5, a fetching assembly 3, a control assembly and a detection assembly. The movable chassis 1, the lifting adjustment assembly 4, the telescoping adjustment assembly 5, the fetching assembly 3, the control assembly and the detection assembly have same structure as those in the embodiment 1, except that the temporary storage shelf 2 has a different configuration, and the structure or contents same as the embodiment 1 will not be described in this embodiment.

As shown in FIG. 6, the temporary storage shelf 2 of the transferring robot 10 provided in this embodiment only includes one temporary storage plate 22, which means that the transferring robot 10 provided in this embodiment can only transfer one target case 20 at a time. The temporary storage plate 22 is located at an inner side of the lifting bracket 41, and the two sides of the temporary storage plate 22 are respectively connected to two connecting plates 51 of the telescoping adjustment assembly 5, so that the lifting and lowering of the telescoping adjustment assembly 5 drives the temporary storage plate 22 to move.

The transferring robot 10 provided in this embodiment can only transfer one target case 20 at a time; however, since the temporary storage plate 22 can move up and down synchronously with the telescoping adjustment assembly 5, pickup or load operation may be performed on target cases 20 located at different heights, which improves the convenience and flexibility of pick-up or loading.

This embodiment further provides a method for locating a center of the target case 20, which is the same as the method in the embodiment 1, and will not be repeated in this embodiment.

This embodiment further provides a case transferring method used in picking up goods, which is the same as the method in the embodiment 1, and will not be repeated in this embodiment.

This embodiment further provides a case transferring method used in loading goods, which includes the following steps:

S1: after receiving loading instruction, the transferring robot 10 moves to a loading area, and the target case 20 is placed on the temporary storage shelf 2 of the transferring robot 10 by labors or by mechanical arms;

S2: the lifting adjustment assembly 4 and the telescoping adjustment assembly 5 rise to a height of a warehouse container where the target case 20 is located;

S3: the transferring robot 10 plans an optimal travel path according to a position of the target case 20 in the warehouse container, and automatically navigates along a warehouse path;

S4: during the automatic navigation of the transferring robot 10, a center position of an area for storing the target case 20 in the warehouse container is determined by the camera module and the position tag code on the warehouse container;

S5: the transferring robot 10 moves to a position corresponding to the center position of the area for storing the target case 20;

S6: the lever driving assembly 34 drives the lever 32 at an end farther from the warehouse container to be placed horizontally;

S7: the telescoping adjustment assembly 5 controls the extending arms 31 to extend by a preset length; and S8: the telescoping adjustment assembly 5 controls the extending arms 31 to retract to an initial state.

This embodiment further provides a warehousing and logistics system, as shown in FIG. 14, including the above-mentioned transferring robot 10 and a warehouse storage container 30 for storing the target case 20.

Embodiment 3

Figure 7:
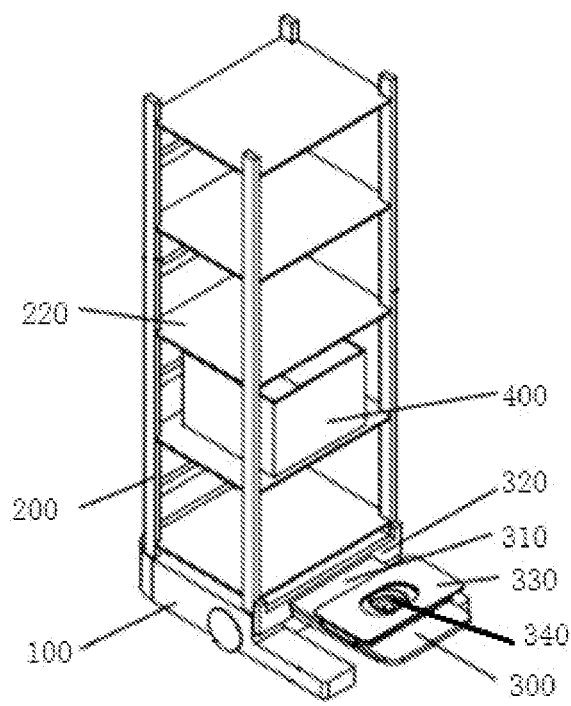
FIG. 7 is a case-transferring robot provided by related art.

FIG. 7 is a case transferring robot provided by related art. As shown in FIG. 7, the robot includes a driving unit 100, a case storage unit 200, and a case transport unit 300. The driving unit 100 carries the case storage unit 200 and the case transport unit 300 to move together. The case storage unit 200 includes one or more case storage spaces. The case transport unit 300 is configured to transport the case 400 between the case storage space and the storage container. The case transport unit 300 includes a frame 310 for placing case(s), a lifting device 320 for driving the case(s) 400 to go up and down, a telescoping fork 330 for driving the case(s) 400 to extend and retract, and a rotating device for driving the case(s) 400 to rotate.

The case transferring robot proposed in the related art can realize transferring of the case(s) 400 other than the storage container, and the robot can transfer multiple kinds of goods at the same time, which improves the transferring efficiency of the transferring robot. However, the case transport unit as in the related art needs the cooperation of the lifting device 320, the telescoping fork 330 and the rotating device 340 to transport the case from the storage container to the case storage unit 200. The structure of the case transport unit 300 is complicated; and in the process of fetching and placing the case, the case needs to be placed in the center of the frame 310, otherwise, after being rotated by the rotating device, the case may be hindered by the guide rail or pallet on the case storage unit and cannot be placed onto the pallet successfully; the operation is complicated and is prone to fail.

Figure 8:
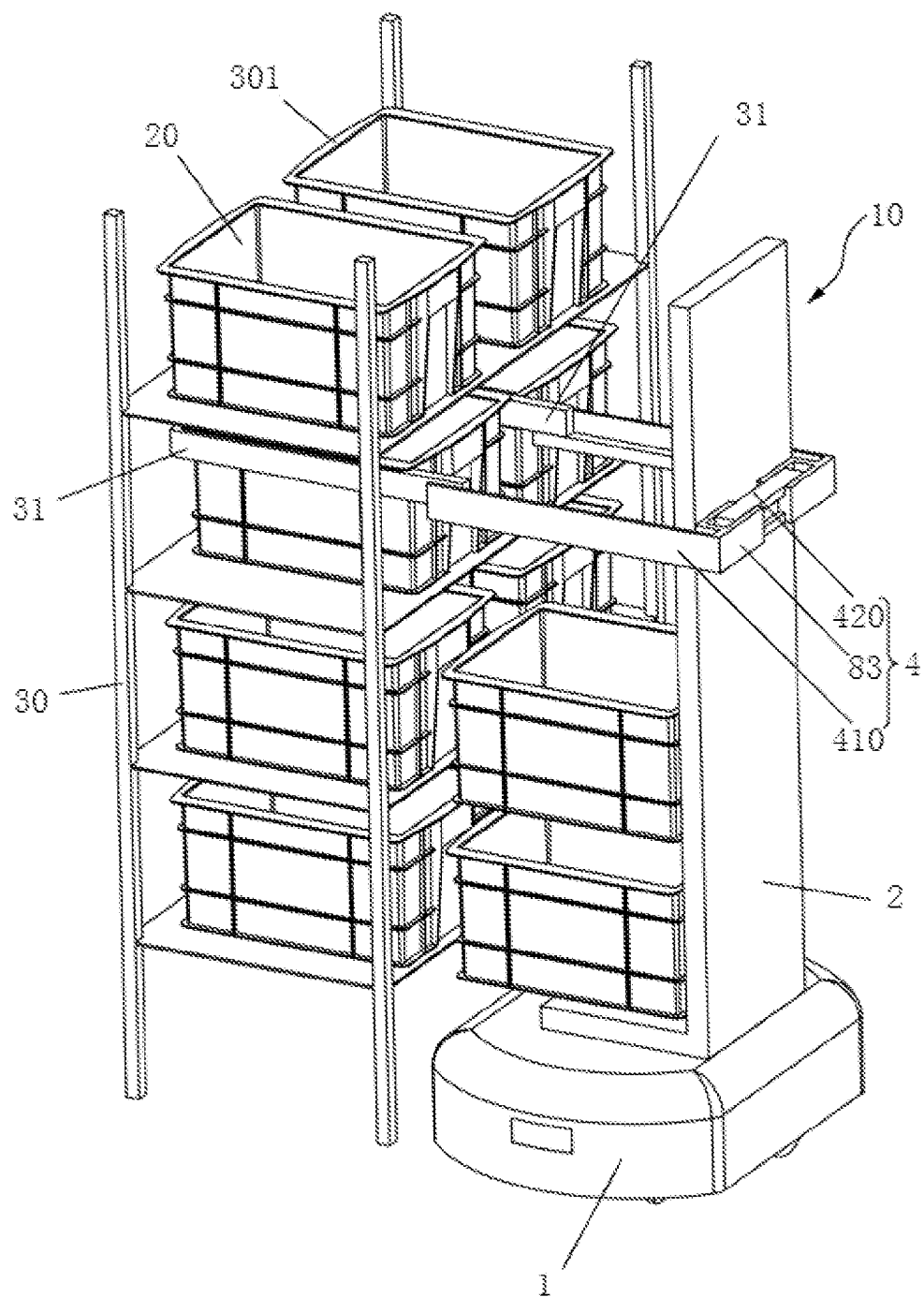
FIG. 8 is a schematic structural diagram of a case-transferring robot provided in Embodiment 3 of the present disclosure in a state of gripping a target case.
Figure 9:
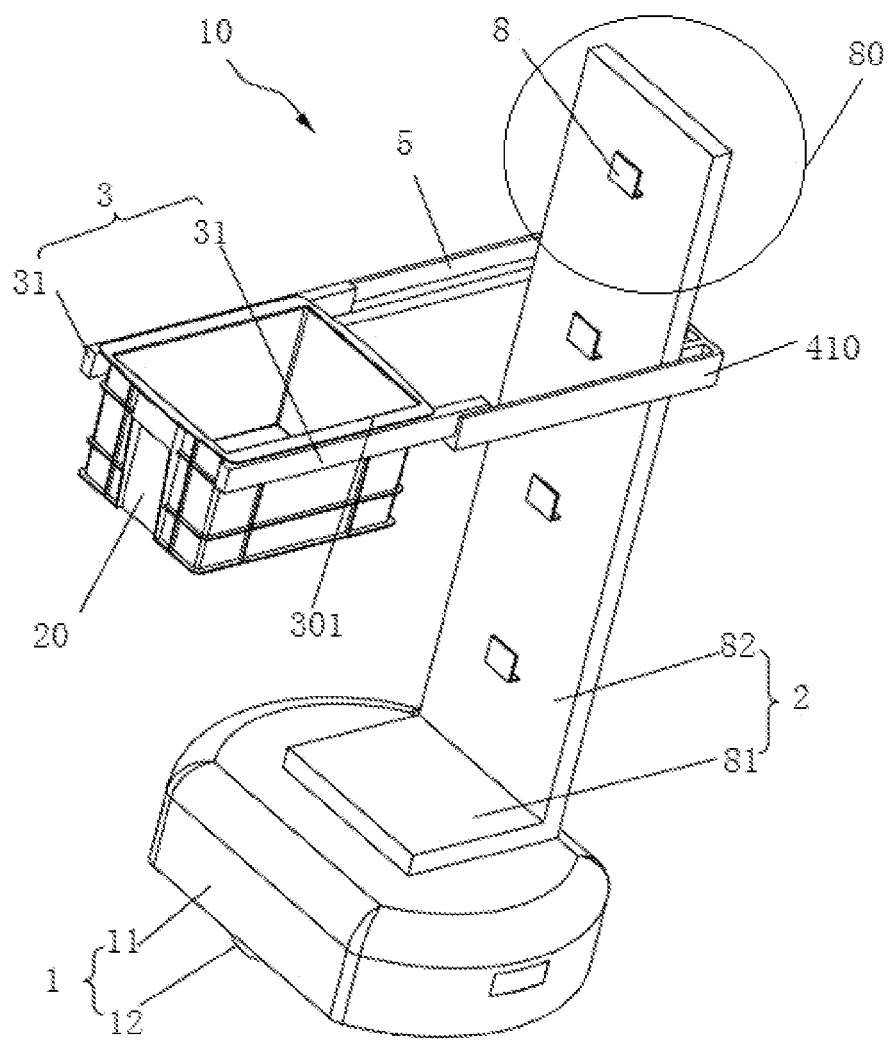
FIG. 9 is a schematic structural diagram of the transferring robot provided in Embodiment 3 of the present disclosure.

FIG. 8 is a schematic structural diagram of a transferring robot 10 provided in an embodiment of the present disclosure in a state of gripping a target case, and FIG. 9 is a schematic structural diagram of the transferring robot provided in an embodiment of the present disclosure. As shown in FIGS. 8 and 9, the embodiment provides a transferring robot 10 configured to realize the transferring of a target case 20. The transferring robot 10 is applicable in warehousing and logistics industry, and performs the picking and transporting of the target case 20 in which ordered goods or express parcels are stored. The transferring robot 10 can also be applied to other environments where the case or goods needs to be transferred. The application of the transferring robot 10 in this embodiment is exemplary.

The transferring robot 10 provided in this embodiment includes: a movable chassis 1 configured to realize movement of the transferring robot 10 on ground and realize transportation of the target case 20 by the transferring robot 10; a temporary storage shelf (or called a stand) 2 provided on the movable chassis 1, configured to fix, support and store the target case 20 to be transferred, where a connecting portion 5 for connecting and fixing the target case 20 is provided on the temporary storage shelf 2; a fetching assembly 3 (configured to clamp the target case 20 and also called clamping assembly) provided on the temporary storage shelf 2, configured to grip the target case 20, fetch the target case 20 from the warehouse storage container (i.e., a storage container external to the transferring robot 10) 30 and place the target case 20 on the temporary storage shelf 2, or fetch the target case 20 from the temporary storage shelf 2 so that the target case 20 is separated from the temporary storage shelf 2, or adjust position of the target case 20 on the temporary storage shelf 2; an adjustment mechanism, provided on the temporary storage shelf 2 and connected with the fetching assembly 3, configured to adjust the position of the fetching assembly 3 relative to the temporary storage shelf 2 and assist the fetching assembly 3 to fetch and place the target case 20 on the temporary storage shelf 2; a control assembly configured to control an operating status of the transferring robot 10; a detection assembly configured to detect a working status of the transferring robot 10 and an environment status, and assist the control assembly to perform intelligent control on the transferring robot 10.

The movable chassis 1 includes a chassis body 11 and a drive wheel mechanism provided at bottom of the chassis body 11, and the drive wheel mechanism is configured to realize the movement of the movable chassis 1. The drive wheel mechanism may adopt a form of differential driving, and includes a drive wheel motor, two drive wheels 12 provided at the bottom of the chassis body 11, and a connecting assembly connecting the drive wheel motor and the two drive wheels. The two drive wheels 12 are respectively provided on two sides of the chassis body 11; the drive wheel motor is provided inside the chassis body 11, and an rotation output shaft of the drive wheel motor is connected with the drive wheels and drives the drive wheels to move, so as to realize the linear or turning movement of the movable chassis 1.

In this embodiment, the drive wheel mechanism is provided on two sides of the middle of the movable chassis 1, which is beneficial to improve the movement steadiness of the movable chassis 1. The chassis body 11 can be further provided with multiple universal driven wheels. For example, the front and rear of the chassis body 11 can each be provided with a pair of universal driven wheels, and the two pairs of universal driven wheels are provided symmetrically with respect to the pair of drive wheels, which is beneficial to further improve the movement steadiness of the movable chassis 1, especially the stability in turning movement of the movable chassis 1, and prevent the movable chassis 1 from toppling during the movement.

The drive wheel mechanism can also adopt other mechanisms that can drive the chassis body 11 to move. This embodiment does not limit the specific form of the drive wheel mechanism, and does not limit the specific structure of the movable chassis 1. Any structure capable of driving the temporary storage shelf 2 to move is applicable, such as the robot structure in the related art.

The temporary storage shelf 2 is provided on a top of the movable chassis 1 and is fixedly connected with the movable chassis 1 so that the movement of the movable chassis 1 drives the temporary storage shelf 2 to move. The temporary storage shelf 2 includes a supporting portion 81 arranged horizontally and a case portion 82 arranged vertically. The supporting portion 81 is connected to an upper end surface of the movable chassis 1. In an embodiment, the upper end surface of the movable chassis 1 is a flat surface, and the supporting portion 81 has a flat structure, which is beneficial to simplify the connection between the temporary storage shelf 2 and the movable chassis 1.

The supporting portion 81 and the movable chassis 1 can be connected in a non-detachable manner. For example, welding is applicable to connect the temporary storage shelf 2 and the chassis body 11 as a whole, which is beneficial to improve the stability of the supporting portion 81 and the chassis body 11. In an embodiment, the movable chassis 1 and the supporting portion 81 are connected in a detachable connection, such as a screw connection, a magnetic connection, etc., which is beneficial to change different types of the temporary storage shelf 2 according to the number of the target cases 20 to be transferred, so as to improve the design universality and usage flexibility of the transferring robot 10.

The case portion 82 is provided with a plurality of case storage areas 80 along the vertical direction, and two adjacent case storage areas 80 are virtually separated, that is, there is no blocking between two adjacent case storage areas 80. In this embodiment, the case portion 82 includes vertically arranged plate-like structure(s). One side of the plate-like structure is provided with a connecting portion 8 for connecting the target case 20. A plurality of connecting portions 8 are arranged at intervals along the vertical direction of the case portion 82, so that the case portion 82 is virtually divided into a plurality of case storage areas 80. By providing the virtually separated case storage areas 80, the movement of the target case 20 among the multiple case storage areas is not obstructed, and the movement of the target case 20 among different case storage areas 80 is facilitated.

In an embodiment, the case portion 82 may be in a fence-like structure, and the connecting portions 8 are provided on the slats of the fence-like structure. In another embodiment, the case portion 82 may have other forms of structure.

The fetching assembly 3 is provided on the case portion 82 and is configured to grip the target case 20. In this embodiment, the fetching assembly 3 includes two extending arms (or called clamping arms) 31. The two extending arms 31 are provided in parallel on two sides of the case portion 82 along a width direction of the case portion 82, and the two extending arm 31 are provided along a thickness direction of the case portion 82.

In this embodiment, a periphery of an open end of the target case 20 extends outwardly with vertical flanges 301. When griping the target case 20, the two extending arms 31 are respectively located on two sides of the target case 20, and the extending arms 31 grip the target case 20 through a contact between an upper surface of the arms and a lower surface of the flanges 301. And when the extending arms 31 are in an initial state, a distance between the two extending arms 31 is greater than a width of the target case 20 and smaller than a maximum width between the flanges 301 on the two opposite sides of the target case 20 to be gripped, so that when the extending arms 31 grip the target case 20, the distance between the two extending arms 31 does not need to be adjusted, and the two extending arms 31 can directly extend into the two sides of the target case 20; through the lifting adjustment assembly 4, the extending arms 31 is raised to contact the flanges 301 of the target case 20 and drive the target case 20 to rise, so that the target case 20 can be gripped. The operation is simple and convenient, the requirement for positioning at the clamping location on the target case 20 by the extending arms 31 is lowered, and the difficulty of adjustment in gripping the target case 20 is reduced.

By arranging the flanges 301 at the open end of the target case 20, the interference between the structure of the target case 20 and the warehouse storage container 30 or between the target case 20 and the temporary storage shelf 2 can be reduced, and the strength of the target case 20 can be enhanced. In other embodiments, the flanges 301 may be provided in the middle of the side walls of the target case 20, or the flanges 301 may be provided only on opposite sides of the target case 20 to be clamped.

In this embodiment, the extending arm 31 is a rod-shaped structure, which is beneficial to simplify the structure of the extending arm 31. In other embodiments, the extending arm 31 may be a plate-shaped structure, or may be a structure such as a pneumatic gripper.

The fetching assembly 3 is connected to the case portion 82 through an adjustment mechanism. The adjustment mechanism includes a lifting adjustment assembly 4, a telescoping adjustment assembly 5 and a lateral adjustment assembly. The lifting adjustment assembly 4 is provided on the temporary storage shelf 2, and is configured to go up and down vertically along the temporary storage shelf 2 and to adjust a position of the fetching assembly 3 in the vertical direction; the telescoping adjustment assembly 5 is provided on the lifting adjustment assembly 4, and is configured to adjust a horizontal distance from the fetching assembly 3 to the case portion 82 by extending or retracting the fetching assembly 3 relative to the case portion 82; the lateral adjustment assembly is configured to adjust a width between the two extending arms 31 to achieve the opening or closing of the two extending arms 31.

In this embodiment, the lifting adjustment assembly 4 is U-shaped, and includes a second adjustment portion 420 constituting a bottom of the U-shape and two first adjustment portions 410 constituting arms of the U-shape. The second adjustment portion 420 is horizontally arranged, along a width direction of the case portion 82, on a side of the case portion 82 away from the connecting portion 8, and the two first adjustment portions 410 are provided on two sides of the case portion 82 in parallel along a thickness direction of the case portion 82.

The lifting adjustment assembly 4 further includes a lifting driving assembly. The second adjustment portion 420 is connected to the case portion 82 through the lifting driving assembly, and can move in a vertical direction relative to the case portion 82. The two first adjustment portions 410 are provided in parallel, and one ends of which are respectively connected, through the lateral adjustment assembly, to the two ends of the second adjustment portion 420 in a width direction of the second adjustment portion 420. The first adjustment portions 410 can move relative to the second adjustment portion 420 alone the width direction of the second adjustment portion 420, to adjust a distance between the two first adjustment portions 410. The two extending arms 31 are respectively connected with the first adjustment portions 410 through the telescoping adjustment assembly 5, so that the extending arms 31 can move along a length direction of the first adjustment portions 410, thereby realizing the extension or retraction of the extending arms 31.

In this embodiment, the lifting driving assembly may include a drive motor and a screw-nut assembly. The screw is rotatable provided in the vertical direction on a side of the case portion 82 away from the target case 20. The second adjustment portion 420 is provided with a nut seat matched with the screw on one side facing the case portion 82. The drive motor is fixed on the case portion 82, and an output shaft is connected with the screw. In this arrangement, the drive motor is provided on the case portion 82, which is beneficial to reduce the size of the second adjustment portion 420. The lifting driving assembly may alternatively include a drive motor and a gear-rack assembly, where the rack is vertically provided on the case portion 82, the gear and the drive motor are provided on the second adjustment portion 420. The lifting driving assembly may be in other structure for realizing the vertical movement of the second adjustment portion 420 relative to the case portion 82, such as hydraulic linear drive, motor cooperating with sprocket chain for driving, motor cooperating with belt for driving, or motor drive cooperating with pulley movement. This embodiment does not limit the specific structure of the lifting driving assembly.

In order to realize the steady lifting of the second adjustment portion 420, a guiding rail is vertically provided on the case portion 82, and a sliding block is provided on the second adjustment portion 420. The sliding block is in sliding connection with the guiding rail, to reduce resistance in the lifting movement of the second adjustment portion 420, and increase the steadiness of the lifting movement of the second adjustment portion 420.

In this embodiment, the extending arms 31 are provided on the inner side of the first adjustment portions 410, which avoids that the first adjustment portions 410 interferes with the target case 20 when the extending arms 31 transfer the target case 20.

In this embodiment, the telescoping adjustment assembly 5 can be in a structure in which a drive motor cooperates with screw-nut, in a structure in which a drive motor cooperates with gear-rack, in a structure in which a drive motor cooperates with chain-sprocket, or in other structures that drives the extending arms 31 to move in translation relative to the first adjustment portion 410. Moreover, in this embodiment, the structure of the drive motor cooperating with the gear-rack is adopted to realize the extending and retracting of the extending arm 31, which is beneficial to reduce the size of the telescoping adjustment assembly 5 and simplify the structure of the telescoping adjustment assembly 5.

In this embodiment, the rack is provided on an outer side of the extending arm 31 along a length direction of the extending arm 31, the gear is provided on the first adjustment portion 410 and meshes with the rack for transmission, and the drive motor is provided on an outer side of the first adjustment portion 410 with an output shaft of the drive motor being connected to the gear. In this arrangement, the gear and the drive motor stay still during the extension and retraction of the extending arm 31, which facilitates the setting of the drive motor, simplifies the structure of the extending arm 31, and prevents the telescoping adjustment assembly 5 from interfering the gripping of the target case 20.

In this embodiment, the extending arm 31 is in a rod-shaped structure with a rectangular cross section, and its length direction is the same as the length direction of the first adjustment portion 410 and perpendicular to the width direction of the case portion 82. This arrangement is beneficial to simplify the structure of the extending arm 31, facilitates the gripping of the target case 20 by the extending arms 31, and facilitates the arrangement of the rack on the outer side of the extending arm 31. However, in this embodiment, the structure of the extending arm 31 is not limited.

In this embodiment, the first adjustment portion 410 is in a rod-shaped structure with an L-shaped cross section. An outer side surface of the extending arm 31 faces an inner side surface of the first adjustment portion 410. The gear is provided on the inner side surface of the first adjustment portion 410 and meshes with the rack for transmission. The drive motor is provided on the outer side surface of the first adjustment portion 410, and an output shaft of the drive motor passes through a vertical edge of the L-shaped section to be connected to the gear. A lower side surface of the extending arm 31 is in sliding connection with an upper surface of the horizontal side of the L-shaped rod structure, which improves the support of the first adjustment portion 410 to the extending arm 31 and ensures the stability of the translation movement of the extending arm 31. The upper surface of the horizontal side can also be provided with a sliding groove, and the lower side surface of the extending arm 31 can be provided with a pulley, so that the pulley is sliding connected in the sliding groove, providing guidance for the movement of the extending arm 31 and improving the steadiness of the movement of the extending arm 31. In other embodiments, the first adjustment portion 410 may alternatively have a plate-like structure or other structures, and the specific structure of the first adjustment portion 410 is not limited in this embodiment.

In this embodiment, the extending arm 31 realizes the relative opening or closing of the two extending arms 31 through the lateral adjustment assembly, which is beneficial to simplify the structural complexity of the extending arm 31, and at the same time simplify the structural complexity of the transferring robot 10 on the side facing the target case 20, reduces the interference of the structures in the transferring robot 10 on the gripping of the target case 20 as much as possible. In an embodiment, the first adjustment portion 410 has an extending portion 83 extending inwardly in an perpendicular manner from one end of the first adjustment portion 410 close to the case portion 82. The extending portion 83 is in sliding connection with the second adjustment portion 420, and the relative linear motion thereof is realized under the driving of the lateral adjustment assembly.

In this embodiment, the lateral adjustment assembly can be any structure that realizes linear movement between two elements. The lateral adjustment assembly can have the same structure as the lifting adjustment assembly 4 or the telescoping adjustment assembly 5, or be of a different structure. Since there are many structures capable of realizing the relative linear movement of two structures, which are common in the art, the specific structure of the lateral adjustment assembly is not described in detail in this embodiment.

In this embodiment, the extending portion 83 is a U-shaped structure with an opening facing the second adjustment portion 420. One end of the second adjustment portion 420 extends into the U-shaped opening of a corresponding extending portion 83, and abuts against inner sides of two vertical sides of the U-shaped structure. Sliding blocks are provided on the inner sides of the two vertical sides of the U-shaped structure, and sliding grooves are respectively provided on two corresponding sides of the second adjustment portion 420. The two sliding blocks of the extending portion 83 are respectively sliding connected in corresponding sliding grooves, which is beneficial to improve the motion stability of the extension portion 83 and the second adjustment portion 420. In other embodiments, the extending portion 83 may alternatively be a plate-shaped or a bar-shaped structure, and is in sliding connection with the second adjustment portion 420 on only one side.

In this embodiment, the two vertical sides of the extending portion 83 are respectively provided on two sides of the second adjustment portion 420 along the thickness direction of the case portion 82. In other embodiments, the two vertical sides of the extending portion 83 may be respectively provided on upper and lower sides of the second adjustment portion 420.

In this embodiment, the second adjustment portion 420 is a long strip structure with an I-shaped cross section, which has a length direction the same as the width direction of the target case 20. The notches on two sides of the I-shaped structure are the foregoing sliding grooves. This arrangement simplifies the structure of the second adjustment portion 420, and facilitates the connection between the second adjustment portion 420 and the first adjustment portion 410. In other embodiments, the second adjustment portion 420 may have other structures, such as structures with U-shaped or L-shaped cross-section.

Each case storage area 80 is provided with a connecting portion 8 for connecting the target case 20, and the target case 20 is provided with a matching portion for matching with the connecting portion 8. In this embodiment, the target case 20 is hooked to the temporary storage shelf 2, the connecting portion 8 is a hook, and one side of the target case 20 is correspondingly provided with a hook groove for matching with the hook; or the connecting portion 8 is the hook groove provided on the case portion 82, and a hook matching with the hook groove is correspondingly provided on one side of the target case 20. This connection has a simple structure and is convenient to set up. During the gripping of the target case 20, the extending arms 31 are raised or lowered by the lifting mechanism to clamp the target case 20, so as to disconnect the target case 20 from the hook or connect the target case 20 to the hook; which does not require high positioning accuracy, reduces the requirements for control accuracy during the gripping of the target case 20, and simplifies the operation and control of the transferring robot 10 for gripping the target case 20.

In an embodiment, the target case 20 and the temporary storage shelf 2 can be connected by magnetic attraction. For example, the connecting portion 8 is set as an electromagnet, the matching portion is set with a metal block, and the target cargo is controlled to be connected to or detached from the temporary storage shelf 2 by controlling the on or off of the electromagnet. Alternatively, the connecting portion 8 can be set as a magnetic element such as a magnetic sticker, and a metal block or a magnetic sticker with opposite polarity may be correspondingly provided on one side of the target case 20.

In another embodiment, the target case 20 and the temporary storage shelf 2 can be connected in a plug-in form, for example, the connecting portion 8 is set as a connecting pin perpendicular to a surface of the case portion 82, and a hole for plug-in of the connecting pin is correspondingly provided on one side of the target case 20; or the connecting portion 8 is set as a hole, and a connecting pin is correspondingly provided on one side of the target case 20. In order to ensure the connection strength, a plurality of holes or connecting pins may be correspondingly provided along the width direction of the case portion 82.

In this embodiment, the hook has an L-shaped structure, one side of which is perpendicular to the surface of the case portion 82, and the other side is parallel to the surface of the case portion 82. The hook can have a certain width along the width direction of the case portion 82 to strengthen the hooking strength of the hook to the target case 20. In other embodiments, a plurality of hooks may be provided at intervals along the width direction of the case portion 82.

In this embodiment, the connecting portion 8 can be integrally formed with the case portion 82, which is beneficial to enhance the structural strength of the connecting portion 8 and improve the supporting of the connecting portion 8 to the target case 20. In other embodiments, the connecting portion 8 can be connected to the case portion 82 in a detachable manner, which is beneficial for the maintenance or replacement of the connecting portion 8.

In this embodiment, the transferring robot 10 is further provided with a control assembly configured to control the operations of the transferring robot 10. The control assembly includes a controller, an information transmission module, and an information-processing module. The movable chassis 1, the lifting adjustment assembly 4, the lateral adjustment assembly, the telescoping adjustment assembly 5, the detection assembly, the information transmission module and the information-processing module are all connected to the controller.

The information transmission module includes a wireless communication module for realizing the communication between the transferring robot 10 and the outside, and a wired communication module for realizing the internal communication in the transferring robot 10. The wireless communication module is configured to perform wireless communication with the order management center to receive order information: when the order management center receives a pick-up order, the order management center analyzes the pick-up order, determines location of ordered goods, and sends the location information of the ordered goods to the transferring robot 10 through the wireless communication module. After receiving the pick-up information and the location information of the ordered goods, the transferring robot 10 controls the movable chassis 1 to move to a warehouse storage container 30 at the corresponding location, to fetch a target case 20 corresponding to the goods and place the target case 20 onto a case storage area 80 of the temporary storage shelf 2. After picking up the goods, the transferring robot 10 transfers the target case 20 to staff processing area. When the order management center receives a loading order, the order management center analyzes the loading order and determines location information where the goods to be loaded according to the loading order should be placed. The order management center dispatches the transferring robot 10 to the staff processing area. The staff places the target case 20 to be loaded onto the case storage area 80 of the transferring robot 10, and the order management center sends the loading information and the location information to the transferring robot 10 via the wireless communication module. The transferring robot 10 controls the movable chassis 1 to move to a warehouse storage container 30 at a location corresponding to the location information, and grips the target case 20 to be loaded from the case storage area 80 and places the target case 20 at a designated position of the warehouse storage container 30.

The wired communication module is configured to realize communication between the controller and the movable chassis 1, the lifting adjustment assembly 4, the telescoping adjustment assembly 5, and the lateral adjustment assembly, to control the movement of the movable chassis 1 to a specific position, the raising or lowering of the extending arms 3 to a specific position, the opening or closing of the extending arms, and/or extending or retracting of the extending arms 3, so as to achieve the accurate gripping and placing of the target case 20 by the extending arms. The controller controls the gripping action toward the target case 20 in the following aspects:

(1) Controlling the extending arms 31 to grip the target case 20 from the warehouse storage container 30 to the case storage area 80 of the transferring robot 10, including the following steps.

S101: The controller controls the lifting adjustment assembly 4 to move, so as to raise the extending arms 31 to a specific position. The specific position corresponds to a position of the target case 20 on the warehouse storage container 30. The specific position can be preset by the controller according to a corresponding layer number on which the target case 20 is located on the warehouse storage container 30, namely, each layer corresponds to a height value.

S102: The controller controls the telescoping adjustment assembly 5 to move, so as to extend the extending arms 31 by a preset length, so that the two extending arms 31 are respectively located on two sides of the target case 20 to be gripped. Since the warehouse storage container 30 and the target case 20 are arranged relatively neatly, the movement and posture of the transferring robot 10 can be preset to ensure that the transferring robot 10 is set with respect to the target case 20 in such a way that the extending arms 31 are located at the two sides of the target case 20 after the extending arms 31 being extended. It is also possible to set up an image acquisition module, such as a Charge Coupled Device (CCD) camera or the like, to collect image location information of the target case 20 and the warehouse storage container 30. The image acquisition module is connected through the controller, so that the controller can adjust the posture of the transferring robot 10 according to the image information collected by the image acquisition module to ensure that the extended arms 31 are located on two sides of the target case 20 after the extended arms 31 being extended.

S103: The controller controls the lifting adjustment assembly 4 to move, so that the extending arms 31 contact the flanges 301 of the target case 20 and raise the corresponding target case 20, so that the target case 20 is out of contact with the warehouse storage container 30.

S104: The controller controls the movable chassis 1 to move, so that the movable chassis 1 moves in a direction away from the warehouse storage container 30 and the target case 20 is out of the range of the warehouse storage container 30.

S105: The controller controls the lifting adjustment assembly 4 to move, so that the target case 20 moves to a preset height. The preset height is specifically set according to a layer number where the target case 20 is located on the warehouse storage container 30 and a layer number where the target case 20 needs to be placed in the case storage area 80.

S106: The controller controls the telescoping adjustment assembly 5 to move, so as to retract the extending arms 31 to an initial position.

S107: The controller controls the lifting adjustment assembly 4 to move so that the extending arms 31 drive the target case 20 to go down until the hook groove of the target case 20 is hooked with the hook.

S108: The controller controls the lifting adjustment assembly 4 to continue moving, so that the extending arms 31 go down and separate from the target case 20.

(2) Controlling the extending arms 31 to grip the target case 20 from the case storage area of the transferring robot 10 to the warehouse storage container 30 of the warehouse, including the following steps.

S201: The controller controls the lifting adjustment assembly 4 move, so as to raise the extending arms 31 to contact with the flanges 301 on the target case 20, and raise the target case 20 so that the target case 20 is out of contact with the hook.

S202: The controller controls the telescoping adjustment assembly 5 to move so that the extending arms 31 extend by a preset length.

S203: The controller controls the lifting adjustment assembly 4 to move, so that the extending arms 31 move to a corresponding height of the warehouse storage container 30 where the target case 20 needs to be placed.

S204: The controller controls the movable chassis 1 to move in such a way that the movable chassis 1 moves toward the warehouse storage container 30, so that the target case 20 extends into a range of the warehouse storage container 30 for placing the target case 20.

S205: The controller controls the lifting adjustment assembly 4 to move so that the extending arms 31 drive the target case 20 to go down, and after the target case 20 contacts the warehouse storage container 30, the extending arms 31 continue to move until the extending arms 31 separate from the target case 20.

S206: The controller controls the telescoping adjustment assembly 5 to move, so as to retract the extending arms 31 to the initial position.

(3) Controlling the extending arms 31 to adjust the position of the target case 20 of the transferring robot 10 among the case storage areas 80 without crossing over the target case 20, including the following steps.

S301: The controller controls the lateral adjustment assembly to move so that the two extending arms 31 are opened with respect to each other until a distance between the two extending arms 31 is greater than a maximum width of the target case 20.

S302: The controller controls the lifting adjustment assembly 4 to move, so that the extending arms 31 move to a height where the target case 20 to be adjusted is located.

S303: The controller controls the lateral adjustment assembly to move, as that the two extending arms 31 are closed to an initial position.

S304: The controller controls the lifting adjustment assembly 4 to move, so that the extending arms 31 go up and contact the flanges 301 on the target case 20 and drive the target case 20 to rise out of contact with the hook.

S305: The controller controls the telescoping adjustment assembly 5 to move so that the extending arms 31 extend to a distance out from interference with the hook.

S306: The controller controls the lifting adjustment assembly 4 to move so that the extending arms 31 drive the target case 20 to move to a height of a target position.

S307: The controller controls the telescoping adjustment assembly 5 to move, so as to retract the extending arms 31 to the initial position.

S308: The controller controls the lifting adjustment assembly 4 to move, so that the extending arms 31 drive the target case 20 to go down and is hooked up, and thereafter the extending arms 31 continue to go down until the extending arms 31 separate from the target case 20.

(4) Controlling the extending arm 31 to adjust the position of the target case 20 of the transferring robot 10 among the case storage areas 80 on basis of crossing over the target case 20, including the following steps.

S401: The controller controls the lateral adjustment assembly to move so that the two extending arms 31 are relatively opened until a distance between the two extending arms 31 is greater than a maximum width of the target case 20.

S402: The controller controls the lifting adjustment assembly 4 to move, so that the extending arms 31 move to a height where the target case 20 to be adjusted is located.

S403: The controller controls the lateral adjustment assembly to move, so as to close the two extending arms 31 to an initial position.

S404: The controller controls the lifting adjustment assembly 4 to move, so that the extending arms 31 go up and contact with the flanges 301 on the target case 20, and drive the target case 20 to rise out of contact with the hook.

S405: The controller controls the telescoping adjustment assembly 5 to move, so that the extending arms 31 extend to a distance out from interference with other target cases 20.

S406: The controller controls the lifting adjustment assembly 4 to move, so that the extending arms 31 drive the target case 20 to move to a height of a target position.

S407: The controller controls the telescoping adjustment assembly 5 to move, so as to retract the extending arms 31 to the initial position.

S408: The controller controls the lifting adjustment assembly 4 to move so that the extending arms 31 drive the target case 20 to go down and is hooked up, and thereafter the extending arms 31 continue to go down until the extending arms 31 separate from the target case 20.

Based on the above analysis, the transferring robot 10 can realize the gripping and placing of the target case 20 between the warehouse storage container 30 and the case storage area 80 of the transferring robot 10, thereby realizing the pickup and loading functions of the transferring robot 10. The transferring robot 10 can also realize the adjustment of the target case 20 among the case storage areas 80 on different layers of the transferring robot 10, so as to organize the ordered goods better and facilitate the pick-up or load operation of the staff.

In the pickup or load operation, the order may involve many kinds of goods which are placed in different warehouse storage containers 30. In order to improve the pickup efficiency of the transferring robot 10, the transferring robot 10 obtain all the target cases 20 involved in the order or at least have all the case storage areas being filled with target cases 20 before move to the staff processing area for subsequent processing.

In this embodiment, the transferring robot 10 further includes an intelligent navigation system, which is connected to the controller. After the controller receives order information and location information corresponding to all ordered goods, the controller transmits the location information of the goods to the intelligent navigation system. The intelligent navigation system autonomously plans an optimal route to each of the location information. Alternatively, the order management center can generate the optimal route for the transferring robot 10 according to the order information, and transmit the optimal route to the intelligent navigation system of the transferring robot 10 through the wireless communication module, so that the transferring robot 10 will arrive at the locations corresponding to the goods in turn according to the optimal route.

For better operation of the transferring robot 10, the transferring robot 10 is further provided with a detection assembly. The detection assembly includes an obstacle avoidance sensor for detecting road obstacles, so that the transferring robot 10 can avoid road obstacles and travel well during operation.

The detection sensor further includes a case detection device for detecting whether there are goods stored in the case storage areas 80 on each layer. The case detection device is proximity switch, pressure sensor or the like designed to detect whether the target case 20 is connected to the case storage area, so as to determine whether the transferring robot 10 is in a fully loaded state, which facilitates the transferring robot 10 in a fully loaded state move to the staff processing area in time to process orders in batches when the number of orders is greater than the number of layers of the case storage areas 80. The case detection device can alternatively be a code scanner installed in the case storage area. By scanning the two-dimensional code or barcode on the target case 20, it is determined whether there is a target case 20 in the case storage area 80, and the information of the goods in the target case 20 on the corresponding layer is obtained, which is helpful for the controller or the order management center to timely know which ordered goods have been transferred by the transferring robot 10.

In an embodiment, a displayer may be provided on the transferring robot 10 to display order information received by the transferring robot 10 and the information of the target case 20 that has been transferred on the transferring robot 10; and at the same time, the displayer may display information of the target case 20 corresponding to each layer of the case storage area 80. This is beneficial for the quick picking of the goods by the staff in the staff processing area, as well as the checking and ordering of the ordered goods.

The transferring robot 10 provided in this embodiment can not only deploy intelligent warehousing robots to pickup and load goods according to orders, but also have functions such as inbound business, outbound business, warehouse allocation, inventory allocation, and virtual warehouse management, so as to realize comprehensive application of batch management, material correspondence, inventory counting, quality inspection management, virtual warehouse management, real-time inventory management and other functions.

This embodiment further provides a warehousing system, as shown in FIG. 14, which includes the aforementioned transferring robot 10 and a warehouse storage container 30 storing the target case 20.

The transferring robot provided by the present disclosure can grip the target case by setting the extending arms, so that the extending arms can easily extend to the warehouse storage container for clamping the target case, and the extending arms can also retract to the case storage area, so that the case can be separated from or placed in the case storage area, the operation is simple and convenient, and the structure of the clamping assembly is simplified, thereby simplifying the structure of the transferring robot; and in the process of clamping or fetching-placing, the case is confined between the two extending arms, therefore it is easy to realize the positioning of the target case relative to the case storage area, which improves the efficiency of the transferring robot to fetch and place the case.

The warehousing system provided in the present disclosure has improved efficiency by adopting the above-mentioned transferring robot.

Embodiment 4

Figure 10:
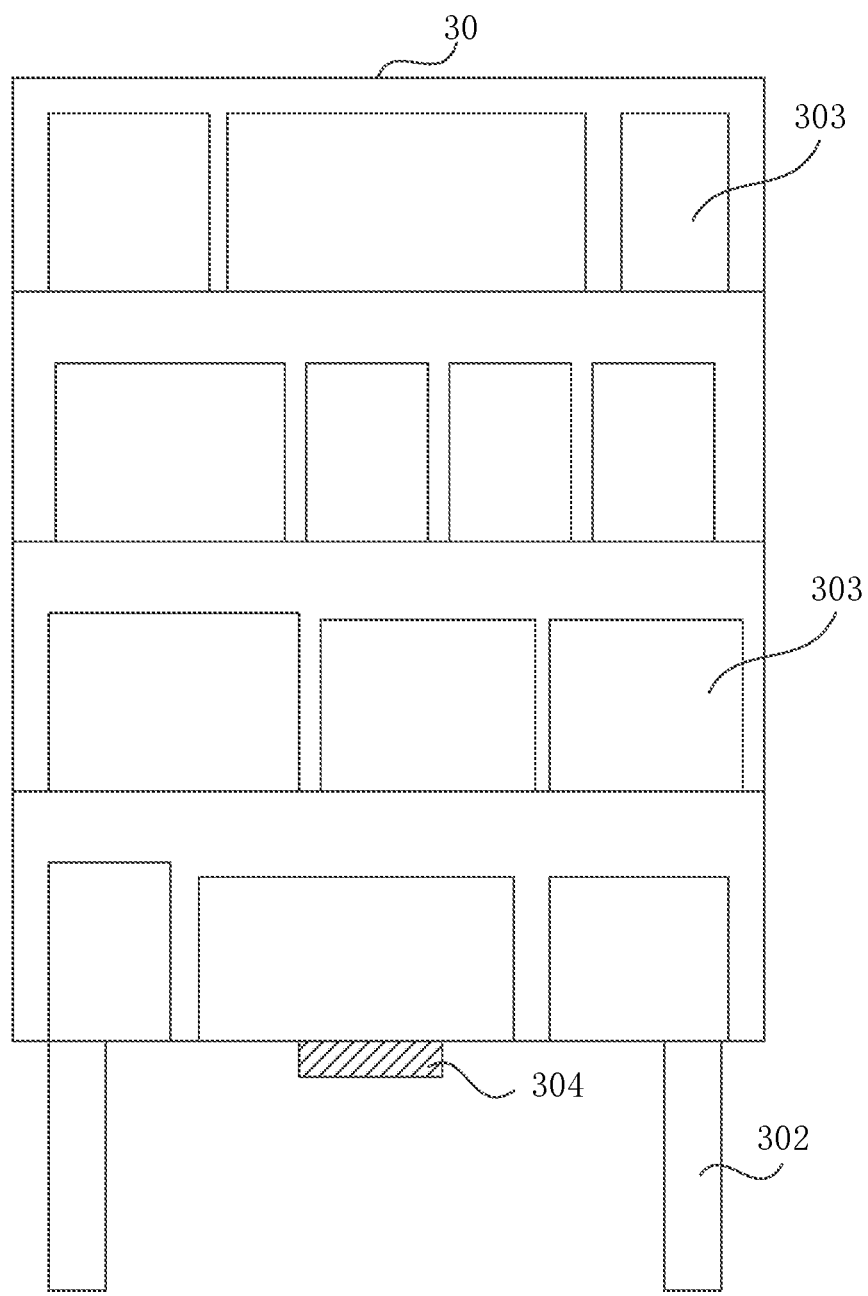
FIG. 10 is a schematic structural diagram of a three-dimensional intelligent warehouse storage container in related technologies.

Three-dimensional intelligent warehouse is a warehousing structure with multiple columns, multiple layers, multiple cells, and multiple storage units, which is established to improve the storage capacity of the warehouse. In order to save space, products with outer packaging are usually stacked in three-dimensional intelligent warehouse. In the stacking process, stacking equipment is usually used to perform transferring and stacking operations between the storage containers in the warehouse. However, the stacking equipment in the related art can usually transfer only one type of case of goods at a time, and the stacking equipment waits for too long when transferring the cases with low efficiency. FIG. 10 shows a schematic structural diagram of a three-dimensional intelligent warehouse storage container. As shown in FIG. 10, the warehouse storage container 30 stores items 303. Of course, the items 303 can be stored in case(s), which is (are) placed on the warehouse storage container 30. In an embodiment, the warehouse storage container 30 includes a plurality of compartments stacked along a vertical direction, and each compartment can accommodate a plurality of items 303. The bottom of the warehouse storage container 30 may include one or more supporting members 302 and an identification code 304 such as a two-dimensional code. During the stacking process, the robot 10 carries out goods transferring and stacking among multiple warehouse storage containers 30 for warehousing. How to efficiently transfer and stack items is one of the key issues to improve the efficiency of warehousing in E-commerce and other fields. Therefore, the present disclosure provides a transferring robot to improve the efficiency of item transferring and stacking in a three-dimensional warehouse.

Figure 11:
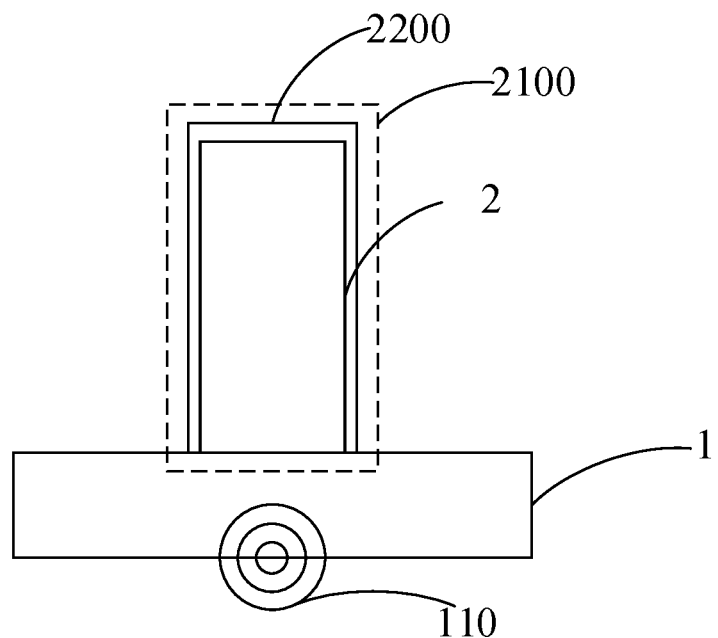
FIG. 11 is a schematic structural diagram of a transferring robot provided in Embodiment 4 of the present disclosure.

FIG. 11 is a schematic structural diagram of a transferring robot 10 provided in this embodiment. The transferring robot 10 includes a movable chassis (also referred to as a robot body) 1 provided with a robot controller, and a stacking mechanism 2100 provided on the movable chassis 1. The movable chassis 1 includes a driving mechanism 110 through which the movable chassis 1 can move within a three-dimensional warehouse. The stacking mechanism 2100 includes a temporary storage shelf 2 and a transmission component 2200. The transmission component 2200 is provided on the temporary storage shelf 2 and moves along a vertical direction of the temporary storage shelf 2 under the control of the robot controller.

In an embodiment, the robot controller 1 is configured to move to a transferring position of at least one target item (for example, the target case 20) according to a received item transferring instruction, where the item transferring instruction includes a travel route of the transferring robot 10, type information of the target item to be transferred, position information of the target item, and a preset transferring position. The at least one target item could be of a same type or of different types. At the same time, the robot controller is configured to control the transmission component 2200 to move up and down in the vertical direction of the temporary storage shelf 2, so as to fetch at least one target item at the transferring position and place the at least one target item onto the temporary storage shelf 2, whereby many different types of items may be fetched in one transferring task, then the fetched items are transported to a designated place for stacking, and the whole process does not require human intervention.

Figure 12:
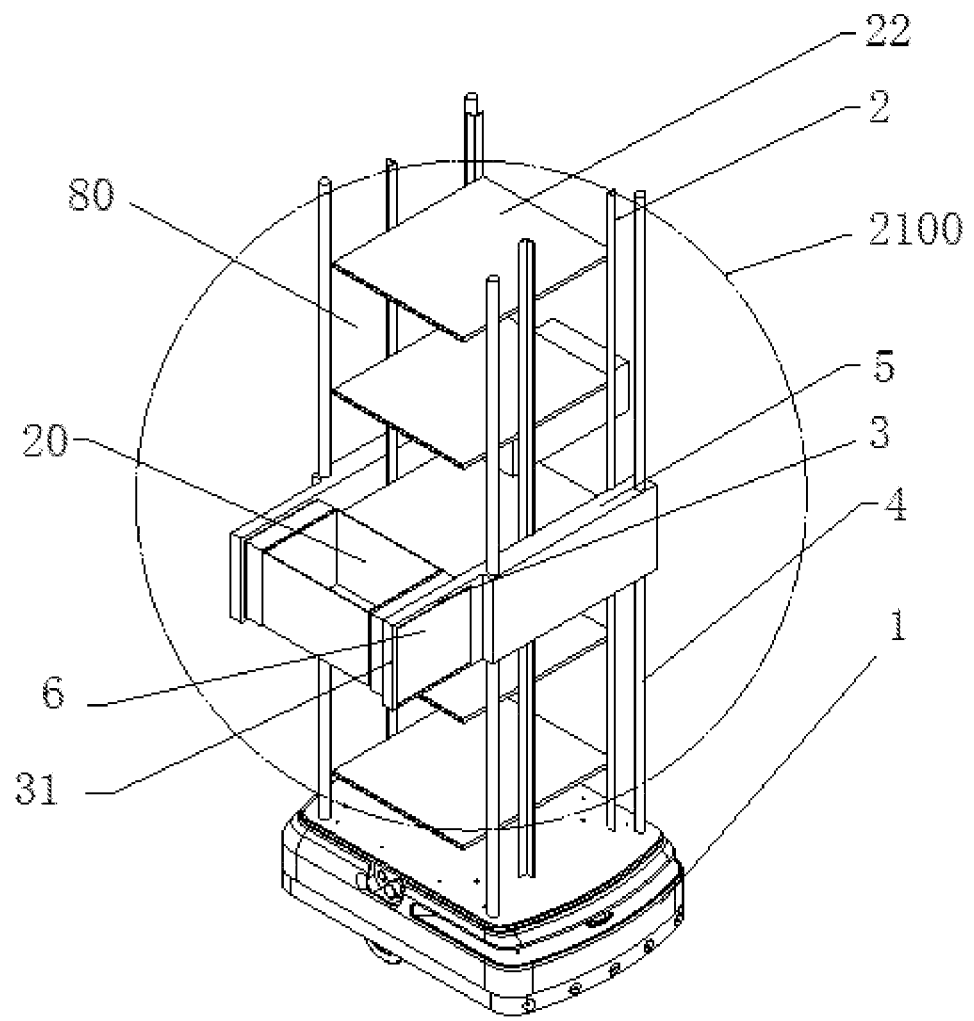
FIG. 12 is a schematic structural diagram of another transferring robot provided in Embodiment 4 of the present disclosure.

Based on the foregoing description, in an embodiment, as shown in FIG. 12, a structure of a transferring robot is shown, including: a movable chassis 1 and a stacking mechanism 2100 (the structure represented by the large circle 2100 in FIG. 12), where the temporary storage shelf 2 in the stacking mechanism 2100 includes a case storage areas 80, and the transmission component includes a lifting adjustment assembly 4, a telescoping adjustment assembly 5, and a fetching assembly 3. The fetching assembly 3 includes extending arms 31 and clamping assemblies 6.

The robot controller is further configured to: before fetching at least one target item, adjust a height of the transmission component to be matched with a height of the target item, thereby ensuring that the target item can be fetched directly when the movable chassis 1 moves to the transferring position, improving the item fetching efficiency and the item transferring efficiency in turn.

In an embodiment, at least two layers of temporary storage plates 22 are provided on the case storage area (also referred to as a storage container of a robot) 80, and the temporary storage plates 22 are configured to carry items (for example, the target case 20). The number of the temporary storage plates 22 can be determined according to actual requirements, and the temporary storage plates 22 can be provided on the temporary storage shelf 2 at an equal interval. Based on the size of the temporary storage plate 22, each temporary storage plate 22 can accommodate multiple items. In an embodiment, since the temporary storage shelf 2 has a plurality of temporary storage plates 22, it is possible to place one type of item on one temporary storage plate 22, which can further ensure that the robot can transfer multiple different types of items at the same time for one transferring task.

Optionally, the lifting adjustment assembly 4 is provided on the temporary storage shelf 2, and the lifting adjustment assembly 4 moves along the vertical direction of the temporary storage shelf 2 under the control of the robot controller 1; the telescoping adjustment assembly 5 is fixed on the lifting adjustment assembly 4. The lifting adjustment assembly 4 is configured to drive the telescoping adjustment assembly 5 to go up and down according to the height of the target item. In other words, the lifting adjustment assembly 4 lifts or lowers the telescoping adjustment assembly 5 to the same height as the target item.

In an embodiment, the telescoping adjustment assembly 5 is connected to the fetching assembly 3. The fetching assembly 3 includes extending arms 31 and clamping assemblies 6, and the clamping assembly 6 is provided on an inner side of the extending arm 31; the extending arms 51 are configured to extend the clamping assemblies 6 to two sides of the target item under the control of the robot controller after the telescoping adjustment assembly 5 moves to the same height as the target item; the clamping assemblies 6 are configured to grip the target item at the corresponding height after the extending arms 31 extend to the two sides of the target item. During operation, a telescoping cylinder or other similar mechanism in the telescoping adjustment assembly 5 drives the extending arms 31 to extend, and then the clamping assemblies 6 extend to fetch the target item.

After the clamping assemblies 6 grip the target item, under the control of the robot controller, the telescoping adjustment assembly 5 further retracts the extending arms 31 to a preset position through the telescoping cylinder or other similar mechanism, so as to place the gripped target item on the temporary storage plate 22. Before fetching the target item, the item transferring instruction received by the robot controller includes indication for placing the target item on a designated layer of temporary storage plate 22. Exemplarily, as shown in FIG. 12, when the target item needs to be placed on the third-layer of temporary storage plate 22 according to the item transferring instruction, after fetching the target item, if the telescoping adjustment assembly 5 is just at a height of the third layer of temporary storage plate 22, the target item is directly placed on the third-layer of temporary storage plate 22 through the telescoping adjustment assembly 5 and the fetching assembly 3; if the height of the telescoping adjustment assembly 5 is lower or higher than the third-layer of temporary storage plate, the height of the telescoping adjustment assembly 5 is adjusted by the lifting adjustment assembly 4 and then the target item is placed on the third-layer of temporary storage plate 22 through the fetching assembly 3.

This application provides a transferring robot, including a robot body (i.e., a movable chassis provided with a robot controller), and a stacking mechanism provided on the robot body. The stacking mechanism includes a temporary storage shelf and a transmission component, and the transmission component is provided on the temporary storage shelf in a height-adjustable manner. When carrying out the task of item transferring, before moving to the transferring position of the target item, the transmission component is adjusted to the height of the target item, which can ensure that the target item is directly fetched when the robot body moves to the transferring position, so as to improving efficiency of item fetching. In addition, the storage container includes multiple pates, which ensures that multiple different types of items can be fetched for one item transferring task. When performing the item fetching task, the robot body controls the transmission component to move up and down in the vertical direction of the temporary storage shelf, fetches at least two target items at different heights after reaching the transferring position, and places the at least two target items onto the temporary storage shelf, whereby multiple types of items can be fetched in one item fetching task and the efficiency of item fetching is improved.

In an embodiment, as shown in FIG. 14, an embodiment of the present disclosure further provides a warehousing system, including the aforementioned transferring robot 10 and a warehouse storage container 30 for storing the target case 20.

Embodiment 5

Figure 13:
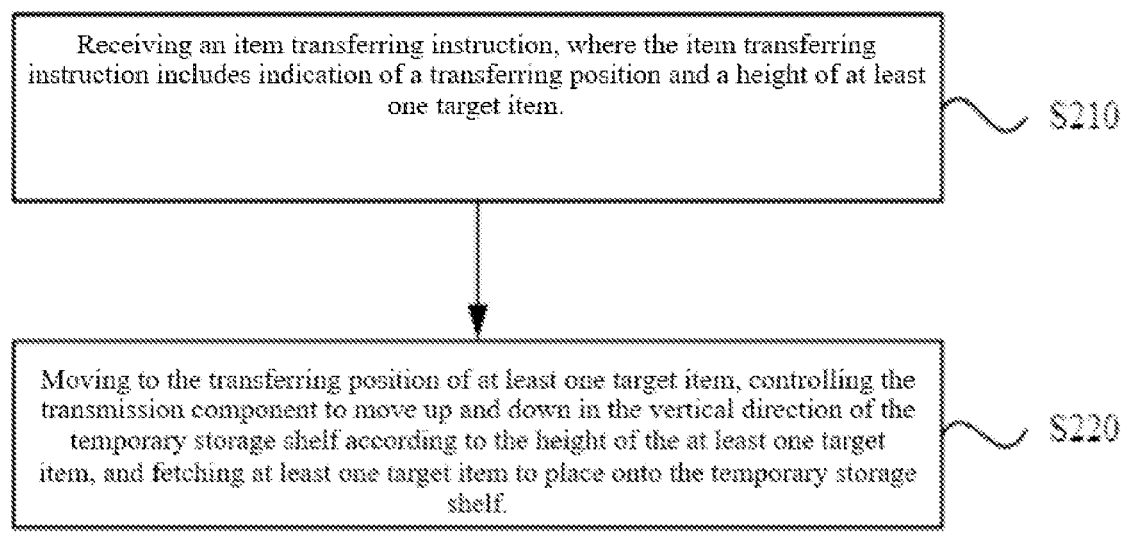
FIG. 13 is a schematic flowchart of a method for item transferring provided in Embodiment 5 of the present disclosure.

FIG. 13 is a schematic flow chart of an item transferring method provided in Embodiment 5 of the present disclosure, which is applicable for transferring and stacking items in a warehouse. The method is executed by a transferring robot. The transferring robot includes a movable chassis provided with a robot controller, and a stacking mechanism provided on the movable chassis; the stacking mechanism includes a temporary storage shelf and a transmission component, and the transmission component is provided on the temporary storage shelf. As shown in FIG. 4, the item transferring method includes the following steps.

S210. An item transferring instruction is received, where the item transferring instruction includes indication of a transferring position and a height of at least one target item.

When transferring and stacking items, the transferring robot receives and executes the item transferring instructions sent by the control center to complete the task of transferring and stacking items. The item transferring instruction includes information about a travel route of the transferring robot, and a transferring position and height of at least one target item. The at least one target item may be of the same type or be of different types. The transferring position refers to a position that is directly in front of the target item and is within a preset distance from the target item.

S220: The transferring robot moves to the transferring position of at least one target item, controls the transmission component to move up and down in the vertical direction of the temporary storage shelf according to the height of the at least one target item, and fetches at least one target item to place onto the temporary storage shelf.

In this embodiment, when the transferring robot receives and executes the item transferring instructions sent by the control center, before arriving the transferring position of the at least one target item, namely, during the movement of the robot, the transmission component is controlled to move up and down along the vertical direction of the temporary storage shelf according to the height of the at least one target item, i.e., to adjust a height of the transmission component to be equal to the height of the target item, so that when the robot moves to the item transferring position, the transmission component directly fetches the target item at the corresponding height and places the target item on the temporary storage shelf.

In an embodiment, after fetching all the target items in the transferring task, the transferring robot transfers the target items to a designated position for stacking. Exemplary, the items can be stacked in sequence according to the types o In an embodiment of the disclosure, the transferring robot 10 may include a calculation unit and a control unit; the calculation unit records a position X1 of the transferring robot 10 once the detection sensor scans an edge of the target case (20) for the first time, and records a position X2 of the transferring robot 10 once the detection sensor scans an edge of the target case 20 for the second time; and calculates a center position of the target case (20) as (X2−X1)/2; and the control unit controls the transferring robot 10 to move to the center position (X2−X1)/2·f the items. In an embodiment, after reaching the designated position, the lifting adjustment assembly drives the telescoping adjustment assembly to move up or down, so that the telescoping adjustment assembly drives the fetching assembly to unload the items from different temporary storage plates for stacking, thereby realizing stacking of items of the same type to improve stacking efficiency.

In the embodiment of the present disclosure, the transferring robot receives and executes the item transferring instructions, moves toward the transferring position of at least one target item, and controls the transmission component to go up and down in the vertical direction of the temporary storage shelf according to the height of the at least one target item during the movement. Once arriving at the transferring position, the target item is directly fetched and placed on the temporary storage shelf, so that multiple different types of target items can be transferred at a time in one transferring task. In addition, the transmission component is controlled to act during the movement, and the item is directly fetched at the transferring position, which reduces the time that the robot waits for the transmission component to act, and improves the efficiency of item fetching.

In an embodiment of the disclosure, the transferring robot 10 may include a calculation unit and a control unit; the calculation unit records a position X1 of the transferring robot 10 once the detection sensor scans an edge of the target case (20) In an embodiment of the disclosure, the transferring robot 10 may include a calculation unit and a control unit; the calculation unit records a position X1 of the transferring robot 10 once the detection sensor scans an edge of the target case (20) for the first time, and records a position X2 of the transferring robot 10 once the detection sensor scans an edge of the target case 20 for the second time; and calculates a center position of the target case (20) as (X2−X1)/2; and the control unit controls the transferring robot 10 to move to the center position (X2−X1)/2. for the first time, and records a position X2 of the transferring robot 10 once the detection sensor scans an edge of the target case 20 for the second time; and calculates a center position of the target case (20) as (X2−X1)/2; and the control unit controls the transferring robot 10 to move to the center position (X2−X1)/2.

What is claimed is:

1. A transferring robot comprising:
   a movable chassis configured to move along a path among adjacent warehouse storage containers;
   a temporary storage shelf provided on the movable chassis, the temporary storage shelf being configured to store a target case;
   a lifting adjustment assembly provided on the movable chassis;
   a telescoping adjustment assembly provided on the lifting adjustment assembly and connected to a fetching assembly, the telescoping adjustment assembly being configured to drive the fetching assembly to extend or retract horizontally, and the lifting adjustment assembly being configured to drive the telescoping adjustment assembly and the fetching assembly to move up or down vertically; and
   the fetching assembly configured to extend or retract horizontally relative to the movable chassis, so as to realize fetching and placing of the target case between the storage containers and the temporary storage shelf, wherein a direction along which the fetching assembly extends or retracts horizontally is perpendicular to a direction along which the movable chassis moves,
   wherein the fetching assembly comprises:
      two extending arms, each extending arm being connected with one telescoping adjustment assembly;
      levers, wherein both ends of each extending arm are connected to the levers, at least one of the levers is in a rotatable manner, and a rotation axis of the at least one of the levers is parallel to a length direction of one extending arm; and
      lever driving assemblies, each lever driving assembly being provided on one extending arm for driving the at least one of the levers to rotate to be perpendicular to each other.

2. The transferring robot according to claim 1, wherein the two extending arms are parallel and oppositely provided on two sides of the temporary storage shelf.

3. The transferring robot according to claim 2, wherein the temporary storage shelf comprises a temporary storage plate, the temporary storage plate is connected with the lifting adjustment assembly and moves up and down through the lifting adjustment assembly, and up and down of the temporary storage plate is synchronized with up and down of the telescoping adjustment assembly.

4. The transferring robot according to claim 2, wherein the temporary storage shelf comprises a plurality of temporary storage plates arranged at intervals along a vertical direction, and each temporary storage plate is provided with an opening for avoiding the telescoping adjustment assembly.

5. The transferring robot according to claim 1, wherein the lever driving assembly is connected to a lever transmission shaft, and the lever transmission shaft is connected to the lever.

6. The transferring robot according to claim 5, wherein at least one of two ends of the lever transmission shaft is connected with the lever.

7. The transferring robot according to claim 6, wherein in a case that both ends of the lever transmission shaft are respectively connected with the lever, the levers located at both ends of a same lever transmission shaft are perpendicular to each other.

8. The transferring robot according to claim 7, wherein extending or retracting of the telescoping plates relative to the connecting plates is synchronized with extending or retracting of the extending arms relative to the connecting plates.

9. The transferring robot according to claim 1, wherein at least one of two ends of each extending arm is provided with detection sensors for detecting a location of the target case.

10. The transferring robot according to claim 7, wherein the detection sensors are further configured for scanning edges of the target case at two sides of the target case in turn during movement of the transferring robot along the path; the transferring robot further comprises a calculation unit and a control unit; the calculation unit is configured for recording a position X1 of the transferring robot once the detection sensor scans an edge of the target case for the first time, and a position X2 of the transferring robot once the detection sensor scans an edge of the target case for the second time; and for calculating a center position of the target case as (X2−X1)/2; and the control unit is configured for controlling the transferring robot to move to the center position (X2−X1)/2.

11. The transferring robot according to claim 1, wherein the telescoping adjustment assembly comprises:
    connecting plates connected with the lifting adjustment assembly; and
    telescoping plates configured to extend or retract along the connecting plates, wherein the extending arms are configured to extend or retract along the telescoping plates.

12. The transferring robot according to claim 1, wherein the temporary storage shelf are provided with a plurality of case storage areas along a vertical direction, and each case storage area is provided with a case detection device for detecting whether the target case is present in the corresponding case storage area.

13. A warehousing system comprising the transferring robot according to claim 1, and a warehouse storage container for storing the target case.

14. The system according to claim 13, wherein the transferring robot is provided with a detection sensor configured for detecting a location of the target case;
    the transferring robot is configured for moving along the path, and scanning edges of the target case at two sides of the target case in turn through the detection sensor during movement of the transferring robot;
    recording a position X1 of the transferring robot once the detection sensor scans an edge of the target case for the first time, and recording a position X2 of the transferring robot once the detection sensor scans an edge of the target case for the second time;
    calculating a center position of the target case as (X2−X1)/2;
    the transferring robot is configured for moving to the center position (X2−X1)/2; and
    extending the fetching assembly of the transferring robot and fetching the target case to the temporary storage shelf when the fetching assembly rises to a height where the target case is located.

15. A transferring robot comprising:
a movable chassis provided with a robot controller, and a stacking mechanism provided on the movable chassis, wherein:
- the stacking mechanism comprises a temporary storage shelf and a transmission component, the transmission component is provided on the temporary storage shelf and is configured to move along a vertical direction of the temporary storage shelf under control of the robot controller;
- the movable chassis provided with a robot controller is configured to move to a transferring position of at least one target case according to a received item transferring instruction; and
- the robot controller is configured to control the transmission component to move up and down along the vertical direction of the temporary storage shelf, fetch the at least one target case, and place the fetched target case onto the temporary storage shelf.

16. The transferring robot according to claim 15, wherein the robot controller is further configured to adjust a height of the transmission component to be adapted for the target case before fetching the at least one target case.

17. The transferring robot according to claim 16, wherein the transmission component comprises:
- a lifting adjustment assembly provided on the temporary storage shelf, wherein the lifting adjustment assembly moves along the vertical direction of the temporary storage shelf under control of the robot controller; and
- a telescoping adjustment assembly fixed on the lifting adjustment assembly;

wherein the lifting adjustment assembly is configured to drive the telescoping adjustment assembly to move up and down according to a height of the target case.

18. The transferring robot according to claim 17, wherein the transmission component further comprises a fetching assembly; the fetching assembly is connected with the telescoping adjustment assembly, the fetching assembly comprises extending arms and clamping assemblies, and the clamping assemblies are provided on inner sides of the extending arms;
- the extending arms are configured to extend, under control of the robot controller, to two sides of the target case after the telescoping adjustment assembly moves to the height adapted for the target case; and
- the clamping assemblies are configured to grip the target case after the extending arms extend to the two sides of the target case.

19. The transferring robot according to claim 16, wherein the telescoping adjustment assembly is further configured to, after the clamping assemblies gripping the target case, drive, under control of the robot controller, the extending arms to retract to a preset position and place the gripped target case onto the temporary storage plate.

20. The transferring robot according to claim 15, wherein the temporary storage shelf comprises a case storage area, the case storage area is provided with at least two layers of temporary storage plates, and the temporary storage plates are configured to carry the target case.

* * * * *